US011662037B2

(12) United States Patent
Lyon

(10) Patent No.: US 11,662,037 B2
(45) Date of Patent: May 30, 2023

(54) FLUID FLOW CONTROL VALVE FOR FLUID FLOW SYSTEMS, AND METHODS

(71) Applicant: CoolIT Systems, Inc., Calgary (CA)

(72) Inventor: Geoff Sean Lyon, Calgary (CA)

(73) Assignee: CoolIT Systems, Inc., Calgary (CA)

( * ) Notice: Subject to any disclaimer, the term of this patent is extended or adjusted under 35 U.S.C. 154(b) by 235 days.

(21) Appl. No.: 16/747,321

(22) Filed: Jan. 20, 2020

(65) Prior Publication Data
US 2020/0232572 A1 Jul. 23, 2020

Related U.S. Application Data

(60) Provisional application No. 62/794,458, filed on Jan. 18, 2019.

(51) Int. Cl.
*F16K 17/40* (2006.01)
*F16K 37/00* (2006.01)
(Continued)

(52) U.S. Cl.
CPC ............ *F16K 17/406* (2013.01); *F16K 3/246* (2013.01); *F16K 31/002* (2013.01); *F16K 37/005* (2013.01); *F16K 17/383* (2013.01)

(58) Field of Classification Search
CPC ...... F16K 17/406; F16K 17/383; F16K 3/246; F16K 31/002; F16K 37/005
(Continued)

(56) References Cited

U.S. PATENT DOCUMENTS 2,181,523 A * 11/1939 Shiels .................. F16K 31/025
137/76
2,586,248 A * 2/1952 Newman ............... F16K 17/383
137/74
(Continued)

FOREIGN PATENT DOCUMENTS

CN 102483242 5/2012
DE 20 2012 002 974 7/2012
(Continued)

OTHER PUBLICATIONS

Ellsworth, M.J. Jr. et al., "The Evolution of Water Cooling for IBM Large Server Systems: Back to the Future," IEEE, CoolIT Systems Inc. Exhibit 1017, pp. 1-9, (2008).
(Continued)

*Primary Examiner* — Minh Q Le
(74) *Attorney, Agent, or Firm* — Ganz Pollard, LLC

(57) ABSTRACT

A fluid flow control valve includes a valve body having a bore configured to convey fluid from an inlet port to an outlet port. The inlet and outlet ports, and the bore therebetween, define a fluid flow path through the valve body. A gate element is disposed in the bore. The gate element is positionable in the bore from a first position, which allows fluid flow through the bore, to a second position which restricts fluid flow through the bore. An actuator is coupled to the gate element and is configured to urge the gate element from the first position toward the second position. A fuse consisting of a transformable retainer is configured to retain the gate element in the first position, while the retainer is in a first condition, and to allow the gate element to move toward the second position when the retainer transforms to a second condition. The transformable retainer may be configured to transform from the first condition to the second condition responsive to a signal, e.g., a signal indicative of a thermal change or a fluid leak. The innovative
(Continued)

valves are especially but not exclusively suited for governing flow in a heat transfer system, particularly a heat transfer system for dissipating heat from a plurality of computer servers. The innovative valves may be embodied in systems, methods, apparatuses, and components.

18 Claims, 8 Drawing Sheets

(51) Int. Cl.
*F16K 31/00* (2006.01)
*F16K 3/24* (2006.01)
*F16K 17/38* (2006.01)

(58) Field of Classification Search
USPC .......... 137/468, 68.11, 68.12, 72, 76, 487.5, 137/457; 251/68, 30.01, 49
See application file for complete search history.

(56) References Cited

U.S. PATENT DOCUMENTS

| | | | |
|---|---|---|---|
| 2,620,815 A * | 12/1952 | Margraf | F16K 17/40 137/70 |
| 3,073,385 A | 1/1963 | Peters | |
| 3,481,393 A | 12/1969 | Chu | |
| 3,730,205 A * | 5/1973 | Guimbellot | F16K 17/383 137/73 |
| 3,817,321 A | 6/1974 | Von Cube et al. | |
| 3,838,705 A * | 10/1974 | Diehl | F16K 17/383 137/75 |
| 3,861,826 A | 1/1975 | Dean, Jr. | |
| 3,896,835 A * | 7/1975 | Wicke | F16K 17/383 137/75 |
| 3,939,328 A | 2/1976 | Davis | |
| 4,139,330 A | 2/1979 | Neal | |
| 4,181,610 A | 1/1980 | Shintani | |
| 4,340,111 A | 7/1982 | Skala | |
| 4,345,643 A | 8/1982 | Dawson et al. | |
| 4,450,472 A | 5/1984 | Tuckerman et al. | |
| 4,488,566 A * | 12/1984 | Hicks | F16K 17/383 137/74 |
| 4,520,298 A | 5/1985 | Abbondanti | |
| 4,561,040 A | 12/1985 | Eastman et al. | |
| 4,564,040 A | 1/1986 | Rudelick | |
| 4,750,086 A | 6/1988 | Mittal | |
| 4,758,926 A | 7/1988 | Herrell et al. | |
| 4,768,581 A | 9/1988 | Gotwald et al. | |
| 4,777,578 A | 10/1988 | Jahns | |
| 4,898,153 A | 2/1990 | Sherwood | |
| 4,909,315 A | 3/1990 | Nelson et al. | |
| 4,940,085 A | 7/1990 | Nelson et al. | |
| 5,016,090 A | 5/1991 | Galyon et al. | |
| 5,018,665 A * | 5/1991 | Sulmone | F16K 31/002 417/292 |
| 5,070,936 A | 12/1991 | Carroll et al. | |
| 5,099,311 A | 3/1992 | Bonde et al. | |
| 5,142,214 A | 8/1992 | Purson et al. | |
| 5,203,401 A | 4/1993 | Hamburgen et al. | |
| 5,218,515 A | 6/1993 | Bernhardt | |
| 5,265,670 A | 11/1993 | Zingher | |
| 5,277,232 A | 1/1994 | Borsheim | |
| 5,294,830 A | 3/1994 | Young et al. | |
| 5,309,319 A | 5/1994 | Messina | |
| 5,441,102 A | 8/1995 | Burward-Hoy | |
| 5,453,641 A | 9/1995 | Mundinger et al. | |
| 5,472,008 A * | 12/1995 | Boarin | F16K 17/30 137/517 |
| 5,522,452 A | 6/1996 | Mizuno et al. | |
| 5,535,818 A | 7/1996 | Fujisaki et al. | |
| 5,542,445 A * | 8/1996 | Adams | F16K 17/36 137/68.12 |
| 5,577,706 A | 11/1996 | King | |
| 5,592,363 A | 1/1997 | Atarashi et al. | |
| 5,628,199 A | 5/1997 | Hoglund et al. | |
| 5,636,653 A | 6/1997 | Titus | |
| 5,646,824 A | 7/1997 | Ohashi et al. | |
| 5,684,671 A | 11/1997 | Hobbs et al. | |
| 5,727,618 A | 3/1998 | Mundinger et al. | |
| 5,731,954 A | 3/1998 | Cheon | |
| 5,823,249 A | 10/1998 | Batchelder | |
| 5,835,347 A | 11/1998 | Chu | |
| 5,841,634 A | 11/1998 | Visser | |
| 5,864,464 A | 1/1999 | Lin | |
| 5,875,637 A | 3/1999 | Paetow | |
| 5,998,240 A | 12/1999 | Hamilton et al. | |
| 6,019,165 A | 2/2000 | Batchelder | |
| 6,024,175 A | 2/2000 | Moore, Jr. et al. | |
| 6,035,655 A | 3/2000 | Hare et al. | |
| 6,256,378 B1 | 7/2001 | Iggulden et al. | |
| 6,327,145 B1 | 12/2001 | Lian et al. | |
| 6,330,525 B1 | 12/2001 | Hays et al. | |
| 6,361,287 B1 | 3/2002 | Hopper | |
| 6,408,937 B1 | 6/2002 | Roy | |
| 6,415,853 B1 | 7/2002 | Tao et al. | |
| 6,415,860 B1 | 7/2002 | Kelly et al. | |
| 6,447,270 B1 | 9/2002 | Schmidt et al. | |
| 6,470,289 B1 | 10/2002 | Peters et al. | |
| 6,679,315 B2 | 1/2004 | Cosley et al. | |
| 6,702,002 B2 | 3/2004 | Wang | |
| 6,748,755 B2 | 6/2004 | Kubo et al. | |
| 6,769,258 B2 | 8/2004 | Pierson | |
| 6,775,137 B2 | 8/2004 | Chu et al. | |
| 6,792,373 B2 | 9/2004 | Tabor | |
| 6,819,563 B1 | 11/2004 | Chu et al. | |
| 6,827,128 B2 | 12/2004 | Philpott et al. | |
| 6,883,347 B2 | 4/2005 | Ayub | |
| 6,896,066 B2 | 5/2005 | Gil | |
| 6,952,345 B2 | 10/2005 | Weber et al. | |
| 6,970,355 B2 | 11/2005 | Ellsworth, Jr. et al. | |
| 6,973,801 B1 | 12/2005 | Campbell et al. | |
| 6,986,382 B2 | 1/2006 | Upadhya et al. | |
| 6,988,534 B2 | 1/2006 | Kenny et al. | |
| 6,993,421 B2 | 1/2006 | Pillar et al. | |
| 7,000,684 B2 | 2/2006 | Kenny et al. | |
| 7,007,506 B2 | 3/2006 | Kubo et al. | |
| 7,012,807 B2 | 3/2006 | Chu et al. | |
| 7,021,367 B2 | 4/2006 | Oikawa | |
| 7,029,647 B2 | 4/2006 | Tonkovich et al. | |
| 7,032,651 B2 | 4/2006 | Winslow et al. | |
| 7,044,198 B2 | 5/2006 | Matsushima et al. | |
| 7,055,581 B1 | 6/2006 | Roy | |
| 7,057,893 B2 | 6/2006 | Nicolai et al. | |
| 7,086,247 B2 | 8/2006 | Campbell et al. | |
| 7,104,312 B2 | 9/2006 | Goodson et al. | |
| 7,123,996 B2 | 10/2006 | Fukushima et al. | |
| 7,124,811 B2 | 10/2006 | Crocker et al. | |
| 7,131,486 B2 | 11/2006 | Goodson et al. | |
| 7,143,816 B1 | 12/2006 | Ghosh et al. | |
| 7,149,084 B2 | 12/2006 | Matsushima et al. | |
| 7,156,159 B2 | 1/2007 | Lovette et al. | |
| 7,190,580 B2 | 3/2007 | Bezama et al. | |
| 7,201,217 B2 | 4/2007 | Johnson et al. | |
| 7,206,203 B2 | 4/2007 | Campbell et al. | |
| 7,209,355 B2 | 4/2007 | Koga et al. | |
| 7,221,270 B2 | 5/2007 | Chen et al. | |
| 7,248,006 B2 | 7/2007 | Bailey et al. | |
| 7,259,963 B2 | 8/2007 | Germagian et al. | |
| 7,259,965 B2 | 8/2007 | Chang et al. | |
| 7,264,359 B2 | 9/2007 | Kawahara et al. | |
| 7,274,566 B2 | 9/2007 | Campbell et al. | |
| 7,278,273 B1 | 10/2007 | Whitted et al. | |
| 7,301,771 B2 | 11/2007 | Hata et al. | |
| 7,315,448 B1 | 1/2008 | Bash et al. | |
| 7,318,322 B2 | 1/2008 | Ota et al. | |
| 7,331,378 B2 | 2/2008 | Bhatti et al. | |
| 7,360,582 B2 | 4/2008 | Olesen | |
| 7,397,661 B2 | 7/2008 | Campbell et al. | |
| 7,405,935 B1 | 7/2008 | Carey | |
| 7,436,666 B1 | 10/2008 | Konshak | |
| 7,455,103 B2 | 11/2008 | Sato et al. | |
| 7,466,549 B2 | 12/2008 | Dorrich et al. | |

(56) References Cited

U.S. PATENT DOCUMENTS

| | | | |
|---|---|---|---|
| 7,466,553 B2 | 12/2008 | Hamman |
| 7,484,530 B2 | 2/2009 | Harvey et al. |
| 7,486,513 B2 | 2/2009 | Hall et al. |
| 7,527,085 B2 | 5/2009 | Iijima et al. |
| 7,591,302 B1 | 9/2009 | Lenehan et al. |
| 7,599,184 B2 | 10/2009 | Upadhya et al. |
| 7,639,499 B1 | 12/2009 | Campbell et al. |
| 7,688,589 B2 | 3/2010 | Chiang |
| 7,757,506 B2 | 7/2010 | Ellsworth, Jr. et al. |
| 7,762,314 B2 | 7/2010 | Campbell et al. |
| 7,791,882 B2 | 9/2010 | Chu et al. |
| 7,806,168 B2 | 10/2010 | Upadhya et al. |
| 7,905,106 B2 | 3/2011 | Attlesey |
| 7,925,746 B1 | 4/2011 | Melton |
| 7,944,694 B2 | 5/2011 | Campbell et al. |
| 7,957,144 B2 | 6/2011 | Goettert et al. |
| 7,961,465 B2 | 6/2011 | Goldrian et al. |
| 7,969,727 B2 | 6/2011 | Tozer et al. |
| 7,971,632 B2 | 7/2011 | Eriksen |
| 7,978,472 B2 | 7/2011 | Campbell et al. |
| 8,051,898 B2 | 11/2011 | Chiang |
| 8,066,057 B2 | 11/2011 | Olesen |
| 8,240,362 B2 | 8/2012 | Eriksen |
| 8,245,764 B2 | 8/2012 | Eriksen |
| 8,250,879 B2 | 8/2012 | MacBain et al. |
| 8,427,831 B2 | 4/2013 | Wei |
| 8,437,129 B2 | 5/2013 | Tung et al. |
| 8,441,789 B2 | 5/2013 | Wu et al. |
| 8,493,735 B2 | 7/2013 | Iijima |
| 8,493,738 B2 | 7/2013 | Chainer et al. |
| 8,499,761 B2 | 8/2013 | Jorczak et al. |
| 8,631,860 B2 | 1/2014 | Tang et al. |
| 8,687,364 B2 | 4/2014 | Chainer et al. |
| 8,724,315 B2 | 5/2014 | Branton |
| 8,746,330 B2 | 6/2014 | Lyon |
| 9,052,252 B2 | 6/2015 | Lyon et al. |
| 9,057,567 B2 | 6/2015 | Lyon |
| 9,215,832 B2 | 12/2015 | Chang et al. |
| 9,453,691 B2 | 9/2016 | Lyon |
| 9,496,200 B2 | 11/2016 | Lyon et al. |
| 9,603,284 B2 | 3/2017 | Lyon |
| 9,723,745 B2 | 8/2017 | Qi et al. |
| 9,733,681 B2 | 8/2017 | Eriksen |
| 10,197,176 B2 * | 2/2019 | Hathaway | F16K 17/383 |
| 10,335,230 B2 | 7/2019 | Willyard et al. |
| 10,364,809 B2 | 7/2019 | Lyon et al. |
| 10,365,667 B2 | 7/2019 | Lyon et al. |
| 2002/0070007 A1 | 6/2002 | Calaman et al. |
| 2002/0153885 A1 | 10/2002 | Blossfeld |
| 2002/0189790 A1 | 12/2002 | Wong |
| 2003/0010379 A1 * | 1/2003 | Kleiner | G01F 15/005 137/75 |
| 2003/0019234 A1 | 1/2003 | Wayburn et al. |
| 2003/0070792 A1 | 4/2003 | Tanaka et al. |
| 2003/0085028 A1 | 5/2003 | Galtz |
| 2003/0151130 A1 | 8/2003 | Cheon |
| 2003/0173839 A1 | 9/2003 | Torii et al. |
| 2003/0230400 A1 | 12/2003 | McCordic et al. |
| 2004/0008483 A1 | 1/2004 | Cheon |
| 2004/0016241 A1 | 1/2004 | Street et al. |
| 2004/0040695 A1 | 3/2004 | Chesser et al. |
| 2004/0042171 A1 | 3/2004 | Takamatsu et al. |
| 2004/0042172 A1 | 3/2004 | Kusaka et al. |
| 2004/0057211 A1 | 3/2004 | Kondo et al. |
| 2004/0100770 A1 | 5/2004 | Chu et al. |
| 2004/0104010 A1 | 6/2004 | Kenny et al. |
| 2004/0104012 A1 | 6/2004 | Zhou et al. |
| 2004/0104022 A1 | 6/2004 | Kenny et al. |
| 2004/0112585 A1 | 6/2004 | Goodson et al. |
| 2004/0123614 A1 | 7/2004 | Stewart |
| 2004/0160741 A1 | 8/2004 | Moss et al. |
| 2004/0182548 A1 | 9/2004 | Lovette et al. |
| 2004/0182560 A1 | 9/2004 | Kenny et al. |
| 2004/0188066 A1 | 9/2004 | Upadhya et al. |
| 2004/0188069 A1 | 9/2004 | Tomioka et al. |
| 2004/0206477 A1 | 10/2004 | Kenny et al. |
| 2004/0221604 A1 | 11/2004 | Ota et al. |
| 2004/0240179 A1 | 12/2004 | Koga et al. |
| 2005/0111187 A1 | 2/2005 | Berens et al. |
| 2005/0069432 A1 | 3/2005 | Tomioka |
| 2005/0126747 A1 | 6/2005 | Chu et al. |
| 2005/0128705 A1 | 6/2005 | Chu et al. |
| 2005/0162280 A1 | 7/2005 | Hayashida et al. |
| 2005/0178531 A1 | 8/2005 | Huang et al. |
| 2005/0180107 A1 | 8/2005 | Naganawa et al. |
| 2005/0205241 A1 | 9/2005 | Goodson et al. |
| 2005/0211417 A1 | 9/2005 | Upadhya et al. |
| 2005/0241809 A1 | 11/2005 | Tomioka et al. |
| 2005/0259397 A1 | 11/2005 | Bash et al. |
| 2005/0269061 A1 | 12/2005 | Brewer et al. |
| 2006/0002080 A1 | 1/2006 | Leija et al. |
| 2006/0002088 A1 | 1/2006 | Bezama et al. |
| 2006/0011329 A1 | 1/2006 | Wang et al. |
| 2006/0094347 A1 | 5/2006 | Tracy et al. |
| 2006/0096738 A1 | 5/2006 | Kang et al. |
| 2006/0096740 A1 | 5/2006 | Zheng |
| 2006/0096743 A1 | 5/2006 | Lee et al. |
| 2006/0137863 A1 | 6/2006 | Lee et al. |
| 2006/0143439 A1 | 6/2006 | Arumugam et al. |
| 2006/0162903 A1 | 7/2006 | Bhatti et al. |
| 2006/0171801 A1 | 8/2006 | Manabe et al. |
| 2006/0185829 A1 | 8/2006 | Duan et al. |
| 2006/0185830 A1 | 8/2006 | Duan |
| 2006/0187638 A1 | 8/2006 | Vinson et al. |
| 2006/0225867 A1 | 10/2006 | Park et al. |
| 2006/0231238 A1 | 10/2006 | Ball, Jr. |
| 2006/0254755 A1 | 11/2006 | Chen et al. |
| 2007/0029069 A1 | 2/2007 | Duan |
| 2007/0034356 A1 | 2/2007 | Kenny et al. |
| 2007/0039719 A1 | 2/2007 | Eriksen |
| 2007/0095512 A1 | 5/2007 | Chen et al. |
| 2007/0107886 A1 | 5/2007 | Chen |
| 2007/0125526 A1 | 6/2007 | Satou et al. |
| 2007/0131396 A1 | 6/2007 | Yu et al. |
| 2007/0163750 A1 | 7/2007 | Bhatti et al. |
| 2007/0193724 A1 | 8/2007 | Lin |
| 2007/0227704 A1 | 10/2007 | Nagai et al. |
| 2007/0227710 A1 * | 10/2007 | Belady | H05K 7/2079 165/122 |
| 2007/0256957 A1 | 11/2007 | Herrmann et al. |
| 2007/0272314 A1 | 11/2007 | Packham |
| 2007/0272392 A1 | 11/2007 | Ghosh et al. |
| 2007/0297136 A1 | 12/2007 | Konshak |
| 2008/0041792 A1 | 2/2008 | Crnkovich et al. |
| 2008/0053641 A1 | 3/2008 | Lai et al. |
| 2008/0128114 A1 | 6/2008 | Lai et al. |
| 2008/0165499 A1 | 7/2008 | Campbell et al. |
| 2008/0179045 A1 | 7/2008 | Hu et al. |
| 2008/0205003 A1 | 8/2008 | Belady |
| 2008/0225478 A1 | 9/2008 | Goettert et al. |
| 2008/0266726 A1 | 10/2008 | Murakami et al. |
| 2008/0288124 A1 | 11/2008 | Huang |
| 2008/0289695 A1 * | 11/2008 | Holzer | F16K 17/383 137/73 |
| 2008/0301941 A1 | 12/2008 | Anderson, Jr. et al. |
| 2008/0304236 A1 | 12/2008 | Murakami et al. |
| 2008/0314367 A1 | 12/2008 | Goulette et al. |
| 2009/0071625 A1 | 3/2009 | Lyon |
| 2009/0101315 A1 | 4/2009 | Cheng |
| 2009/0120622 A1 | 5/2009 | Koch |
| 2009/0139698 A1 | 6/2009 | Robinson |
| 2009/0154096 A1 | 6/2009 | Iyengar et al. |
| 2009/0228893 A1 | 9/2009 | Behrendt et al. |
| 2009/0306833 A1 | 12/2009 | Vinson et al. |
| 2009/0322543 A1 | 12/2009 | Crnkovich et al. |
| 2010/0012294 A1 | 1/2010 | Bezama et al. |
| 2010/0032142 A1 | 2/2010 | Copeland et al. |
| 2010/0065355 A1 | 3/2010 | Reddy |
| 2010/0085708 A1 | 4/2010 | Martin et al. |
| 2010/0101765 A1 * | 4/2010 | Campbell | H05K 7/20809 165/104.33 |
| 2010/0103619 A1 | 4/2010 | Refai-Ahmed et al. |
| 2010/0103620 A1 | 4/2010 | Campbell et al. |
| 2010/0139887 A1 | 6/2010 | Slessman |

(56) References Cited

U.S. PATENT DOCUMENTS

| | | |
|---|---|---|
| 2010/0179695 A1 | 7/2010 | Collins et al. |
| 2010/0182809 A1 | 7/2010 | Cullinane et al. |
| 2010/0206869 A1 | 8/2010 | Nelson et al. |
| 2010/0211669 A1 | 8/2010 | Dalgas et al. |
| 2010/0324962 A1 | 12/2010 | Nesler et al. |
| 2010/0326634 A1 | 12/2010 | Eriksen |
| 2011/0084839 A1 | 4/2011 | Groth et al. |
| 2011/0100045 A1 | 5/2011 | Carlson |
| 2011/0100618 A1 | 5/2011 | Carlson |
| 2011/0115223 A1 | 5/2011 | Stahlkopf et al. |
| 2011/0127027 A1 | 6/2011 | Kashirajima et al. |
| 2011/0154842 A1 | 6/2011 | Heydari et al. |
| 2011/0168379 A1 | 7/2011 | Morgan et al. |
| 2011/0174001 A1 | 7/2011 | Carlson et al. |
| 2011/0175498 A1 | 7/2011 | Bash et al. |
| 2011/0303394 A1* | 12/2011 | Branton ............. H05K 7/20754 165/104.33 |
| 2011/0313576 A1 | 12/2011 | Nicewonger |
| 2011/0315407 A1 | 12/2011 | Park et al. |
| 2011/0317367 A1 | 12/2011 | Campbell |
| 2012/0103009 A1 | 5/2012 | Ding et al. |
| 2012/0147553 A1* | 6/2012 | Eriksen ............. H05K 7/20272 361/679.53 |
| 2012/0152498 A1 | 6/2012 | Lyon |
| 2012/0175094 A1 | 7/2012 | Rice |
| 2012/0176745 A1 | 7/2012 | Heiberg et al. |
| 2012/0186790 A1 | 7/2012 | Delia et al. |
| 2012/0271567 A1 | 10/2012 | Da Pont et al. |
| 2012/0273159 A1 | 11/2012 | Eriksen |
| 2013/0025818 A1* | 1/2013 | Lyon ................. H05K 7/20781 165/11.1 |
| 2013/0107453 A1 | 5/2013 | Chainer et al. |
| 2013/0184927 A1 | 7/2013 | Daniel et al. |
| 2013/0203032 A1 | 8/2013 | Bardsley et al. |
| 2013/0206359 A1 | 8/2013 | Bertilsson et al. |
| 2013/0277008 A1 | 10/2013 | Ishikura et al. |
| 2013/0288630 A1 | 10/2013 | Suzuki |
| 2013/0340843 A1* | 12/2013 | Gilmer ................. F16K 17/406 137/68.11 |
| 2013/0340995 A1 | 12/2013 | David et al. |
| 2014/0069111 A1 | 3/2014 | Campbell et al. |
| 2014/0103950 A1 | 4/2014 | Janitch |
| 2014/0126147 A1 | 5/2014 | Chen |
| 2014/0147289 A1 | 5/2014 | Tian et al. |
| 2014/0158326 A1 | 6/2014 | Lyon |
| 2014/0186156 A1 | 7/2014 | Lai et al. |
| 2014/0245708 A1 | 9/2014 | Kawabe et al. |
| 2014/0251582 A1 | 9/2014 | Lyon |
| 2014/0262180 A1 | 9/2014 | Lyon et al. |
| 2014/0266744 A1 | 9/2014 | Lyon et al. |
| 2014/0332195 A1 | 11/2014 | Liverman |
| 2015/0083368 A1 | 3/2015 | Lyon |
| 2015/0108934 A1 | 4/2015 | Wong et al. |
| 2015/0176931 A1 | 5/2015 | Aeberhard et al. |
| 2015/0166362 A1 | 6/2015 | Govindan et al. |
| 2015/0168474 A1 | 6/2015 | Yoshioka et al. |
| 2015/0355630 A1 | 12/2015 | Cader et al. |
| 2016/0281704 A1 | 9/2016 | Lyon et al. |
| 2016/0290216 A1 | 10/2016 | Katragadda et al. |
| 2016/0377355 A1 | 12/2016 | Lyon |
| 2017/0030228 A1 | 2/2017 | Jordan, Jr. et al. |
| 2017/0064874 A1 | 3/2017 | Lyon et al. |
| 2017/0196116 A1 | 7/2017 | Lyon |
| 2019/0039437 A1 | 2/2019 | Jentz et al. |
| 2019/0116694 A1 | 4/2019 | Lyon et al. |
| 2019/0353370 A1 | 11/2019 | Hern et al. |
| 2019/0354121 A1 | 11/2019 | Lyon |
| 2019/0368832 A1 | 12/2019 | Huang et al. |
| 2020/0004156 A1 | 1/2020 | Hsieh et al. |
| 2020/0025641 A1 | 1/2020 | Long et al. |
| 2020/0271237 A1* | 8/2020 | Srinivasa ................. F16K 7/126 |
| 2020/0348202 A1 | 11/2020 | Farkas et al. |

FOREIGN PATENT DOCUMENTS

| | | |
|---|---|---|
| EP | 1 808 892 | 7/2007 |
| JP | 61-32449 | 2/1986 |
| JP | H03-17443 | 1/1991 |
| JP | 06-120387 | 4/1994 |
| JP | 7-183678 | 7/1995 |
| JP | 10-173114 | 6/1998 |
| JP | 2001-255027 | 9/2001 |
| JP | 2002-151638 | 5/2002 |
| JP | 2003-243581 | 8/2003 |
| JP | 2005-351600 | 12/2005 |
| JP | 2007-180505 | 7/2007 |
| JP | 2007-227902 | 9/2007 |
| JP | 2007-531991 | 11/2007 |
| JP | 2008-140879 | 6/2008 |
| JP | 2009-529621 | 8/2009 |
| JP | 2011-114206 | 6/2011 |
| JP | 3179086 | 10/2012 |
| TW | M273031 | 8/2005 |
| TW | M298733 | 10/2006 |
| TW | I266039 | 11/2006 |
| TW | 201305522 | 2/2013 |
| TW | 201320883 | 5/2013 |
| TW | 201441626 | 11/2014 |
| TW | M587771 | 12/2019 |
| WO | 01/65900 | 9/2001 |
| WO | 03/055055 | 7/2003 |
| WO | 2005/017468 | 2/2005 |
| WO | 2005/096377 | 10/2005 |
| WO | 2006/052317 | 5/2006 |
| WO | 2006119761 | 11/2006 |
| WO | 2007/029253 | 3/2007 |
| WO | 2014/141162 | 9/2014 |

OTHER PUBLICATIONS

Ellsworth, M.J. Jr. P.E., "Thermal Design and Implementation of Robust Liquid Cooling Systems for High Performance Computer Systems," Systems and Technology Group, IBM, InterPACK '11, dated Jul. 6-8, 2011, pp. 1-64.

Kandlikar, S.G., "High Flux Heat Removal with Microchannels. A Roadmap of Challenges and Opportunities," Heat Transfer Engineering. vol. 26 No. 8 : 5-14, (2005), pp. 5-14.

Knight, R.W., et al., "Heat Sink Optimization with Application to Microchannels," IEEE Transactions on Components, Hybrids, and Manufacturing Technology, vol. 15, No. 5, Oct. 1992, pp. 832-842.

Merriam-webster definition of beveled, dated Jan. 26, 2016, retrieved from internet URL: http://www.merriam-webster.com/dictionary/beveled, pp. 1-4.

Schmidt, R.R., "Liquid Cooling is Back," Electronics Cooling Magazine, Published Aug. 1, 2005, Retrieved from the Internet URL: https://www.electronics-cooling.com/2005/08/liquid-cooling-is-back/, on Apr. 30, 2014, pp. 1-7.

Steinke, M., and Kandlikar, S.G., "Single-Phase Heat Transfer Enhancement Techniques In Microchannel and Minichannels Flows," Microchannels and Minichannels—2004, published on Jun. 17-19, 2004, Rochester, New York, pp. 1-8.

Torres, G., "CoolIT Water-Cooling Products," Published Jan. 14, 2008, Retrieved from Internet URL: http://www.hardwaresecrets.com/coolit-water-cooling-products/3/, on Apr. 24, 2014, pp. 1-9.

Vertal, L., "Water Cooling Comes of Age, Again," Asetek Data Center Liquid Cooling, Published on Oct. 11, 2013, Retrieved from the Internet URL: htt5s://www.asetek.com/press-room/blog/2013/water-cooling-comes-of-age-again/, on Nov. 9, 2015, pp. 1-4.

CPU-360 Water Block (AMD/Intel Processor). Rev 1.1, Koolance, (https://koolance.com/cpu-360-processor-water-block) last accessed on Oct. 30, 2020, 11 page.

"Asetek WaterChill Antarctica Water Cooling Kit," Asetek, (https://www.extremeoverclocking.com/reviews/cooling/WaterChill_Antarctica_1.html) last accessed on Oct. 30, 2020, 11 pages.

Hilbert Hagedoom, "Aseteck Waterchill Watercooling—p. 1—a Chill Introduction," Guru3D.com, Feb. 28, 2005, 25 pages.

(56) References Cited

OTHER PUBLICATIONS

Hilbert Hagedoom, "Koolance CPU-360 Waterblock," Guru.com, Feb. 9, 2010, (https://www.guru3d.com/news-story/koolance-cpu-360-waterblock), last accessed on Nov. 3, 2020, 2 pages.
"Electronic-Actuated Valves," Direct Industry,(https://www.directindustry.com/industrial-manufacturer/electrically-actuated-valve-118189.html), last accessed Jun. 16, 2022).
Centrifugal Pump Overview, Appendix B., http://nptel.ac.in/courses/11210117/ui/Course_hone-8.htm, Jan. 5, 2018, pp. 1-10.
3DGAMEMAN, "#530—Asetek WaterChill2 Water Cooling Kit," YouTube, Jul. 16, 2006, (https://www.youtube.com/watch?v=60XNAXO9cxY) last accessed on Oct. 30, 2020.
3DGAMEMAN, "#596—Asetek Xtreme WaterChill Water Cooling Kit," YouTube, Jul. 17, 2006, (https://www.youtube.com/watch?v=Z9XSJBCJttU) last accessed on Oct. 29, 2020.
Adrian Willson, "(1080) Koolance CPU 360 CPU Waterblock Review," YouTube, Mar. 14, 2010, (https://www.youtube.com/watch?v=hhWP7rF1uQs) last accessed on Oct. 30, 2020.
Super1080P, "(1080) Koolance CPU 360 CPU Waterblock Review," YouTube, Mar. 17, 2010, (https://www.youtube.com/watch?v=3kg4Yvl1XLU) last accessed on Oct. 30, 2020.
"WaterChill CPU Cooler Antarctica for Intel Socket 478, AMD Socket A/754/940," Apr. 13, 2004, 14 pages, Version 4.0, Asetek, Inc.
"WaterChill CPU Cooler Antarctica for Intel Socket 478, AMD Socket 462/754/940," Jun. 4, 2004, 9 pages, Version 4.1, Asetek, Inc.
"WaterChill CPU Cooler Antarctica for Intel Socket 478, AMD Socket A/754/940," Mar. 30, 2004, 2 pages, Version 4.0, Asetek, Inc.
"WaterChill CPU Cooler Antarctica Pour Port Intel Socket 478, AMD Socket 462/754/940," Jun. 4, 2004, 10 pages, Version 4.0, Asetek, Inc.
"WaterChill CPU-Kühler Antarctica für Intel Socket 478, AMD Socket 462/754/940," Jun. 4, 2004, 10 pages, Version 4.0, Asetek, Inc.
Refrigerador de CPUs WaterChill Antarctica Para Intel Socket 478, AMD Socket 462/754/940, Jun. 4, 2004, 9, pages, Version 4.0, Asetek, Inc.
"WaterChill CPU-Kühler Antarctica für Intel Socket 478, AMD Socket 462/754/939/940," Jun. 4, 2004, & Oct. 18, 2004, 9 pages, Version 4.0 & 4.1, Asetek, Inc.
"WaterChill CPU Cooler Antarctica for Intel Socket 478, AMD Socket 462/754/939/940," Jun. 4, 2004 & Oct. 18, 2004, 9 pages, Version 4.0 & 4.1, Asetek, Inc.
"Refrigerador de CPUs WaterChill Antarctica Para Intel Socket 478, AMD Socket 462/754/939/940," Jun. 4, 2004 and Oct. 18, 2004, 9, pages, Version 4.0 & 4.1, Asetek, Inc.
"WaterChill CPU Cooler Antarctica Pour Port Intel Socket 478, AMD Socket 462/754/939/940," Jun. 4, 2004 & Oct. 18, 2004, 10 pages, Version 4.0 & 4.1, Asetek, Inc.
Dave Altavilla, "Asetek Antarctica WaterChill Water Cooling Kit.," HotHardware.com, Jun. 8, 2004, (https://hothardware.com/reviews/asetek-antarctica-waterchill-water-cooling-kit) last accessed on Nov. 3, 2020, 7 pages.
Rob Darby," Internal Flow Applications," Chemical Engineering Fluid Mechanics, 2001, pp. 195-238, Chapter 7, Marcel Dekker, Inc., New York, NY.
John S. Scott, "Header" and "Manifold," Dictionary of Civil Engineering, 4th Edition, 1993, pp. 211 and 269, Van Nostrand Reinhold, New York, NY.
"Asetek WaterChill" Techspot, Mar. 14, 2006 (https://www.techspot.com/community/topics/asetek-waterchill.46119/), last accessed Sep. 30, 2021, 7 pages.
"Asetek Antarctica Waterblock" Overlookers, Feb. 28, 2004 (https://www.overclockers.com/asetek-antarctica-waterblock/) last accessed, Sep. 30, 2021, 6 pages.
"Asetek Antarctica WaterChill CPU Cooling Kit Review," Overclocker Club, Apr. 25, 2004 (https://www.overclockersclub.com/reviews/asetek/5.htm) last accessed Sep. 30, 2021.
Matthew Homan, "WaterChill by Asetek," TechwareLabs, LLC, Dec. 11, 2004, (http://www.techwarelabs.com/reviews/cooling/asetek_waterchill/) last accessed on Oct. 30, 2020 3 pages.
Ryszard Sommefeldt, "Review: Asetek WaterChill Antarctica KT03A-L30," HEXUS.net, Aug. 2, 2004, 3 pages (https://rn.hexus.net/tech/reviews/cooling/791-asetek-waterchill-antarctica-kt03a-l30/?page=2) last accessed Sep. 30, 2021.
"Asetek Reviews" TechPowerUp Review Database (https://www.techpowerup.com/reviewdb/Cooling/Water/Asetek/) last accessed Sep. 30, 2021, 3 pages.
"Electronic-Actuated Valves," Direct Industry, Available at https://www.directindustry.com/industrial-manufacturer/electrically-actuated-valve-118189.html (last visited Mar. 26, 2022).

\* cited by examiner

US 11,662,037 B2

FLUID FLOW CONTROL VALVE FOR FLUID FLOW SYSTEMS, AND METHODS

RELATED APPLICATIONS

This application claims the benefit of and priority to U.S. Application No. 62/794,458, filed on Jan. 18, 2019, which is hereby incorporated by reference in its entirety, for all purposes.

BACKGROUND

The innovations and related subject matter disclosed herein (collectively referred to as the "disclosure") pertain to control valves for fluid-flow systems and associated methods of governing flows in response to a triggering event within a fluid-flow system. This disclosure is especially but not exclusively suited for governing flow in a heat transfer system, particularly a heat transfer system for dissipating heat from a plurality of computer servers. The innovations may be embodied in systems, methods, apparatuses, and components, as contemplated by this disclosure.

A heat transfer system using fluids to dissipate heat from computer servers will be generally used as a representative system to illustrate the innovations. For example, a typical server rack of the type used in a data center can accommodate 42 individual servers, each server corresponding to a cooling node within a heat-transfer system. Naturally, some server racks can accommodate more or fewer individual servers. As well, some server racks might not be fully populated. Some coolant-distributers use one or more rack-level (e.g., "centralized") pumps to distribute coolant among a plurality of connected cooling nodes, and it would be desirable for a given coolant-distributer embodiment to be suitable for use across a variety of server-rack configurations, such as for use with a fully-populated 42U rack housing 42 individual servers, as well as a lightly populated 10U rack housing, e.g., 5 individual servers, and a custom 60U rack housing 60 (or more) individual servers.

Conventionally, coolant-distributers have been designed to operate under a maximum expected load, e.g., without being adjustable to operate at lesser loads. For example, a conventional coolant-distributer for a typical 42U rack typically has one or more pumps arranged and selected to distribute coolant among 42 individual cooling nodes (e.g., one node for each of 42 individual servers housed in the 42U rack). In that example, the pumps can be selected to operate efficiently and to deliver an optimal pressure-head and optimal flow-rates to the various nodes throughout the cooling system when such a conventional coolant-distributer is used in conjunction with a fully-populated server rack. Various conduits may be associated with the system to deliver fluid. The conduits couple with pumps, heat transfer elements, and other elements in the system. If a leak, disconnection, rupture, or decoupling occurs within or between conduits and/or other elements in the system, different serious problems may occur. For example, the cooled computer servers or other cooled system may overheat from lack of fluid flow to associated heat transfer elements or the released fluid may short or otherwise damage servers or other systems or items exposed to the released fluid.

Solenoids are known mechanisms for controlling valves and hence fluid flow in various systems that include flowing fluids. Unfortunately, solenoids add expense and complexity to the known systems. They are also electrical mechanisms that are vulnerable to failure based on internal defects or wear and tear. Likewise, external wiring for power or control can be or become faulty.

Accordingly, a need exists for fluid flow control systems and mechanisms that can economically, simplistically, and effectively control fluid flow in response to a trigger event, particularly a trigger event corresponding to a leak or other fluid release in the cooling system, or a disconnection, rupture, or decoupling that occurs within or between conduits and/or other elements in the cooling system, which might result in a fluid release.

SUMMARY

Innovations and related subject matter disclosed herein overcome many problems in the prior art and address one or more of the aforementioned needs or other needs.

In an embodiment, a fluid flow control valve includes a valve body having a bore configured to convey fluid from an inlet port to an outlet port. The inlet and outlet ports, and the bore therebetween, define a fluid flow path through the valve body. A gate element is disposed in the bore. The gate element is positionable in the bore from a first position, which allows fluid flow through the bore, to a second position which restricts fluid flow through the bore. An actuator is coupled to the gate element and is configured to urge the gate element from the first position toward the second position. A fuse consisting of a transformable retainer is configured to retain the gate element in the first position, while the retainer is in a first condition, and to allow the gate element to move toward the second position when the retainer transforms to a second condition. The transformable retainer may be configured to transform from the first condition to the second condition responsive to a signal, e.g., a signal indicative of a thermal change or a fluid leak. The innovative valves are especially but not exclusively suited for governing flow in a heat transfer system, particularly a heat transfer system for dissipating heat from a plurality of computer servers. The innovative valves may be embodied in systems, methods, apparatuses, and components.

In the foregoing and other embodiments, the actuator is movable from a first position to a second position to thereby effect the movement of the gate element from its first position to its second position.

In the foregoing and other embodiments, the retainer is configured to transform from a rigid form in the first condition to a softened or melted form in response to a signal.

In the foregoing and other embodiments, the retainer may be a metal material that is configured to transform from a rigid form to a softened or melted form in response to the signal.

In the foregoing and other embodiments, a heating element associated with the retainer can heat and cause the transformation of the thermoplastic material in response to the signal.

In the foregoing and other embodiments, the heating element is integrated with the retainer.

In the foregoing and other embodiments, the retainer may be a thermoplastic material overmolded on the heating element.

In the foregoing and other embodiments, the retainer may be a meltable metal that serves both to retain the actuator and as a heating element that is a resistive heater.

In the foregoing and other embodiments, the actuator may comprise a spring that moves the gate element from the first position to the second position on transformation of the retainer.

In the foregoing and other embodiments, the spring may be a compression spring that moves the gate element from the first position to the second position, as the spring decompresses on transformation of the retainer.

In the foregoing and other embodiments, the spring may be an extension spring that moves the gate element from the first position to the second position, as the spring retracts on transformation of the retainer.

In an embodiment, a fluid-flow control system includes a valve with a fluid fuse and a heat exchanger fluidically thermally coupled with the valve. The valve includes a valve body having a bore for flowing fluid from an inlet port to an outlet port, the inlet and outlet ports, and the bore therebetween, defining a fluid flow path through the valve body. A gate element is disposed in the bore and is positionable in the bore from a first position which allows fluid flow through the bore to a second position which restricts fluid flow through the bore. An actuator is coupled to the gate element for moving the gate element between the first and second positions, the actuator moving from a first position to a second position to effect the movement. A fuse comprising a transformable retainer is selectably coupled to the actuator, the coupled retainer maintaining the actuator in its first position in a first condition but facilitating the release of the actuator to its second position on transforming to a second condition in response to a signal.

In the foregoing and other embodiments, one or more heat dissipation elements may be fluidically thermally coupled to the heat exchanger. In the foregoing and other embodiments, the heat dissipation elements may be a plurality of processing units that are sources of resistive heating.

In the foregoing and other embodiments, the heat exchanger may be one or more heat-exchange modules, and the processing units are included in a rack of servers, each heat exchange module being fluidically thermally coupleable to one or more processing units.

In the foregoing and other embodiments, each heat exchange module may include a pump for moving a heat-exchange fluid through the module.

In the foregoing and other embodiments, the system may further include a plurality of heat-exchangers and a plurality of servers, each server including a heat dissipation element fluidically thermally coupled to one of the heat exchangers.

In the foregoing and other embodiments, the system may have a plurality of the disclosed valves, each valve fluidically thermally coupled to one or more of the heat exchangers and/or servers.

In the foregoing and other embodiments, the system may further include a controller that is configured to send the signal to the fuse on a predetermined trigger event. In the foregoing and other embodiments, the controller may be configured to send the signal to the fuse based on the system sensing a predetermined change in a fluid flow condition in the system. In the foregoing and other embodiments, the change in condition is indicative of a fluid leak in the system.

In the foregoing and other embodiments, the transformable retainer may be mounted between a first movable projection and a second fixed projection, the first projection being mechanically coupled to the actuator such that spring is maintained in a loaded state until the retainer is transformed in response to a trigger event, the transformation of the retainer freeing the actuator to move from its first position to its second position.

In the foregoing and other embodiments, the actuator may comprise a spring that moves the gate element from the first position to the second position on transformation of the retainer, and wherein the spring comprises a compression or an extension spring that moves the gate element from the first position to the second position, as the spring relaxes on transformation of the retainer; and wherein the transformable retainer is mounted between a first movable projection and a second fixed projection, the first movable projection being mechanically coupled to the actuator such that spring is maintained in a loaded state until the retainer is transformed in response to a trigger event, the transformation of the retainer freeing the actuator to move from its first position to its second position.

In the foregoing and other embodiments, the retainer may be a sacrificial interface between a first movable projection and a second fixed projection, the first movable projection being mechanically coupled to the actuator such that spring is maintained in a loaded state until the retainer is transformed in response to a trigger event, the transformation of the retainer freeing the actuator to move from its first position to its second position. In the foregoing and other embodiments, the sacrificial interface may be a layer of a selectively meltable material disposed between the projections.

In an embodiment, a method of controlling flow in a fluid-flow system, includes the steps of:

(1) operating a fluid flow system, the system including: a valve body having a bore for flowing fluid from an inlet port to an outlet port, the inlet and outlet ports, and the bore therebetween, defining a fluid flow path through the valve body; a gate element disposed in the bore and being positionable in the bore from a first position which allows fluid flow through the bore to a second position which restricts fluid flow through the bore; an actuator coupled to the gate element for moving the gate element between the first and second positions, the actuator moving from a first position to a second position to effect the movement; a fuse comprising a transformable retainer that is selectably coupled to the actuator, the coupled retainer maintaining the actuator in its first position in a first condition but facilitating the release of the actuator to its second position on transforming to a second condition in response to a signal; a heat exchanger fluidically thermally coupled to the valve; and a controller that is configured to send the signal to the fuse on a predetermined trigger event;

(2) monitoring fluid flow in the system;

(3) determining a trigger event; and (4) sending a signal to the fuse causing the transformation of the retainer and thereby movement of the gate element from the first position to the second position and thereby restriction of fluid flow in the valve.

Other innovative aspects of this disclosure will become readily apparent to those having ordinary skill in the art from a careful review of the following detailed description (and accompanying drawings), wherein various embodiments of disclosed innovations are shown and described by way of illustration. As will be realized, other and different embodiments of systems, controllers and methods incorporating one or more of the disclosed innovations are possible and several disclosed details are capable of being modified in various respects, each without departing from the spirit and scope of the principles disclosed herein. For example, the detailed description set forth below in connection with the appended drawings is intended to describe various embodiments of the disclosed innovations and is not intended to represent the only contemplated embodiments of the innovations disclosed herein. Instead, the detailed description includes specific details for the purpose of providing a comprehensive understanding of the principles disclosed herein. Accordingly, the drawings and detailed description are to be regarded as illustrative in nature and not as restrictive.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of systems incorporating aspects of the presently disclosed principles are illustrated by way of example, and not by way of limitation.

DETAILED DESCRIPTION

Figure 1A:
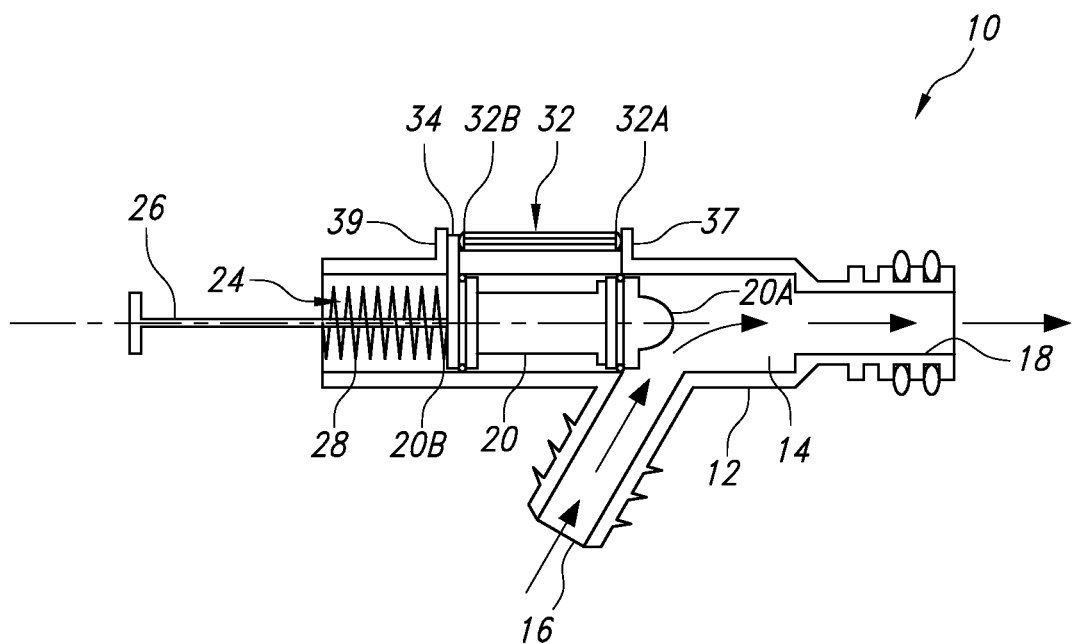
FIG. 1A schematically illustrates an elevational cross-section of a fluid control valve with a fluid fuse, with a gate element in the valve positioned so as to leave the valve in an open condition.

The following describes various principles related to systems, controllers and methods by way of reference to specific examples of systems, controllers and methods, including specific arrangements of valves, heat exchangers, conduits, pumps, sensors, and actuators.

Systems, controllers and methods having attributes that are different from those specific examples discussed herein can embody one or more of the innovative principles, and can be used in applications not described herein in detail. Embodiments of systems, controllers and methods not described herein in detail may also fall within the scope of this disclosure, as will be appreciated by those of ordinary skill in the art following a review of this disclosure.

In this disclosure, a fluid may consist of a gas, a liquid, a liquid containing a dissolved gas or dissolved gases, a mixture of gas and liquid, gas and suspended solids, liquid and suspended solids, or a mixture of gas, liquid and suspended solids, where it can be assumed that such mixtures have the properties of either a compressible or an incompressible fluid.

Fuse Valves

FIGS. 1-4 show a fluid control valve (and components thereof) that includes a valve body that has a valve bore defined therein. A least one inlet and at least one outlet are fluidically coupled to the bore. Each pairable inlet and outlet define a fluid path through the valve. A gate element is movably associated with each fluid path. In a first position, the gate element permits fluid flow through the fluid path. In a second position, the gate element blocks fluid flow or restricts it relative to the first position. An actuator is operably directly or indirectly physically coupled to the gate element to facilitate movement of the gate element from the first position to a second position. The actuator has a first position that is blocked or locked under load. When the actuator is released from its first position, it is free to release its load and travel toward a second position. When the actuator moves to a second position, it urgingly engages and moves the gate element to its corresponding second position.

The valve includes a fuse that is operably coupled to the actuator. The coupling can be a direct or indirect mechanical coupling. When the fuse is a first condition, it resists the load on the actuator and blocks or locks the actuator and, consequently, the gate element to maintain them in their respective first positions. When the fuse transforms, e.g., on a trigger event, to a second condition, the fuse ceases to resist the loaded actuator, causing (1) the actuator to move into its second position, and, correspondingly, (2) the gate element to move into its second position. The fuse is configured to change from the first to the second condition responsive to a predetermined trigger event. For example, the trigger event could be a wireless or wired electrical signal. It could be based on another physical event such as a change in temperature, pressure, sound, etc.

In one possible embodiment, the fuse is a retainer that mechanically retains the actuator in the first position by structurally coupling to the actuator and, e.g., a valve body, and retaining the actuator in the position. It is configured to physically lock or block the actuator from changing position. On a signal corresponding to a trigger event, the retainer is configured to undergo structural transformation that unlocks or unblocks the actuator. In an embodiment, the fuse is a retainer that mechanically retains the gate element in the first position, maintaining a load applied to the gate element by the actuator. As the retainer under goes a structural transformation, the actuator is unblocked or unlocked, with the load being released and transferred to the gate element, which thereby moves into a second position that blocks or restricts fluid flow through the valve body.

The foregoing principles will now be illustrated by referring to representative embodiments shown in FIGS. 1-4. Valve 10 has a body 12 and an axial bore 14, having a cylindrical form. A least one inlet 16 and at least one outlet 18 are fluidically coupled to the bore. The inlet, bore, and outlet define a fluid path through the valve, indicated by arrows in FIG. 1A. A gate element 20 is movably associated with the fluid path in a fluid-flow portion of the bore. The gate element has a cylindrical form that is complementary to the form of cylindrical bore 14. In a first position, the gate element is retracted proximal to (behind) the inlet and the outlet and thereby permits fluid flow through the fluid path indicated by the arrows (FIGS. 1A and 1C). In a second position, seen in FIGS. 1B and 1D, the gate element is advanced forward of the inlet 16 so that it blocks fluid flow through the fluid path or restricts it relative to the first position. In the illustrated examples, the gate element's distal end portion 20A is a plug that complements outlet 18's size and shape so that the distal end sealingly engages the opening of the outlet. In other embodiments, the gate element can be configured to seal just the inlet or just the outlet, as well as both the inlet and outlet. The distal end portion 20A may include one or more O-rings 22 or other seal enhancements. The proximal end portion 20B may similarly have one or more O-rings or other seal enhancements. In one possible embodiment, the gate element is sized and shaped so that when it is advanced into a second position, its cylindrical side walls align with and seal inlet 16 simultaneously with the distal end's sealing of outlet 18.

Figure 1B:
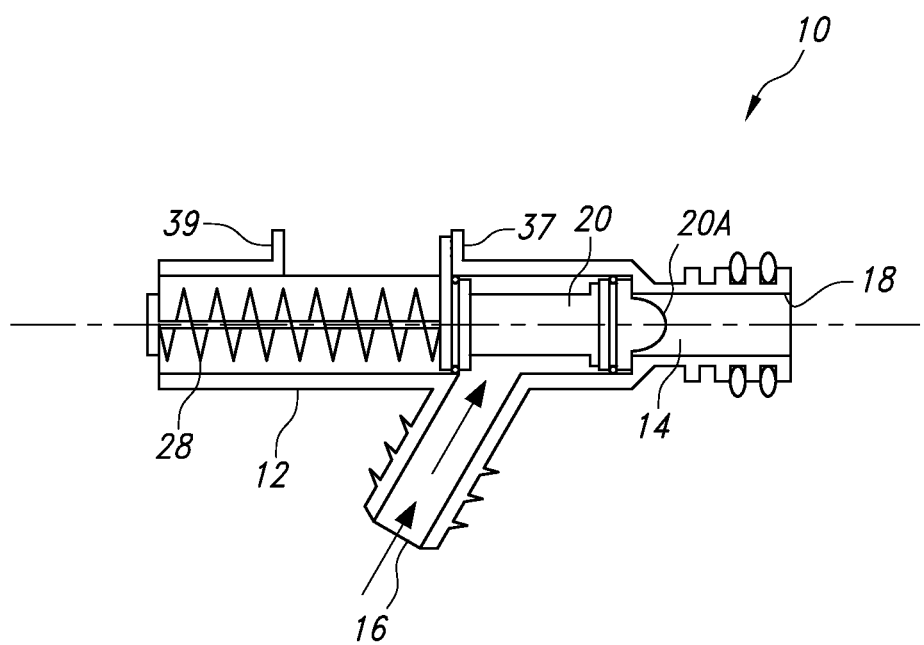
FIG. 1B is the same as FIG. 1A but with the gate element in the valve positioned so as to leave the valve in a closed condition.
Figure 1C:
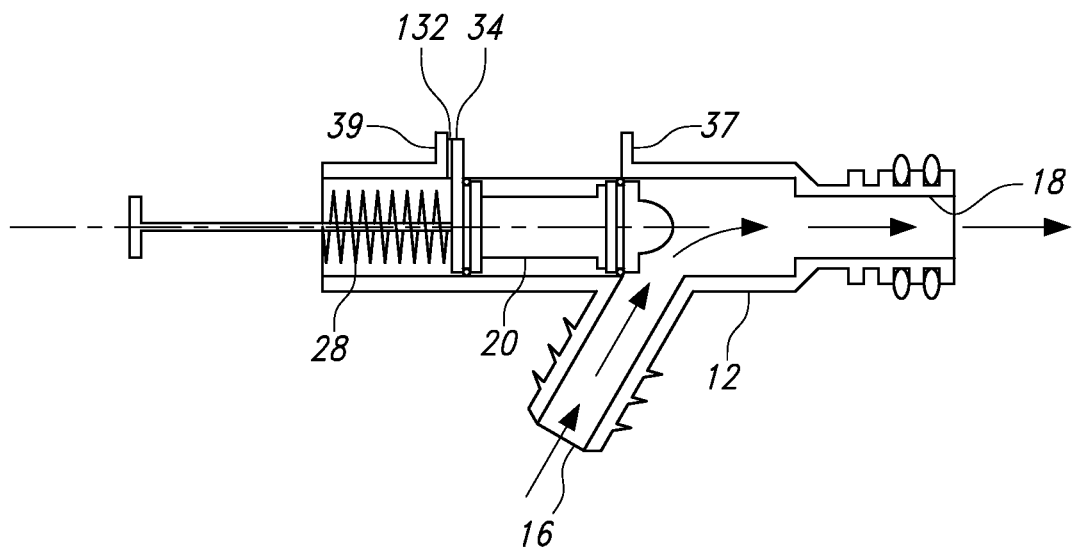
FIG. 1C schematically illustrates an elevational cross-section of an alternative embodiment of a fluid control valve with a fluid fuse, with a gate element in the valve positioned so as to leave the valve in an open condition.

An actuator 24 is disposed in bore 14 proximal to inlet 16 and/or outlet 18. It is operably (i.e., mechanically) coupled to the gate element to facilitate movement of the gate element from the first position to a second position. (As with other operably or mechanically coupled parts contemplated herein, the coupling can be direct or indirect, so long as intended operability occurs through a mechanical linkage.) In this example, the actuator is a spring assembly slideably disposed in an actuator housing portion of the bore, when the spring is in a compressed state (FIGS. 1A and 1C). This state is the actuator's first position. In the illustrated example, the assembly includes shaft 26 that extends through the actuator housing portion of the bore such a shaft can be used to manually open an otherwise closed valve, as by retracting the gate element toward its first position. A compression spring 28 is circumferentially and fixedly disposed around the shaft and axially disposed in the bore. The gate element is structurally coupled to the distal end of the shaft such that the gate element slidably moves with the shaft. The distal end of the spring is coupled to or urges against the proximal end of gate element 20. The proximal end of the spring abuts the proximal end of the valve body. The proximal end of the valve body can be closed except for a small opening that shaft 26 travels through under fluidic seal or can be open as long as a flange, tab, or other structure that is provided to capture the actuator spring within the proximal position of the axial bore where the spring is compressed. The actuator is maintained in the first position by fuse assembly. Fuse assembly includes a retainer 32 and mounts or supports 37, 39 for supporting the retainer. In the embodiment of FIGS. 1A-1B, retainer 32 is disposed between a movable projection 34 and a fixed projection 37 or other bracket-like elements between which the retainer can be coupled. The fuse assembly is coupled to the actuator 24 such that it is held in compression (FIG. 1A) or tension (FIG. 1C). Under one or the other condition, the retainer retains the gate element in an open, first position (FIGS. 1A and 1C) that allows fluid flow through the valve until a predetermined trigger event occurs that signal or induces a transformation of the retainer, as discussed below in more detail.

In the embodiment of FIGS. 1A-1B, the fuse is an elongate structural element that is disposed on or in the valve body. It is configured to mechanically couple with the actuator 24, locking or blocking the actuator in its first position (FIG. 1A). For example, the structural element could be a transformable retainer 32 consisting of a rigid, elongate member that is disposed parallel to the longitudinal axis of the bore, i.e. it is parallel to the path in which the gate element 20 travels in bore 14. The retainer has sufficient rigidity to maintain spring 28 in its compressed or tensioned state when the actuator is in the first position (FIG. 1A). In this exemplary embodiment, when actuator 20 is in the first position, retainer 32 has a proximal end portion 32B that aligns at or near the proximal end portion 20B of gate element 20 retainer 32 has a distal end portion 32A that aligns at or near the distal end portion 20A of the gate element.

The proximal end portion 20B of the gate element may include a projection 34 formed thereon or attached thereto, e.g., a flange, tab, jut, or other projection, which is structurally part of or otherwise formed on or attached to the gate element. Projection 34 moves with the gate element. Projection 34 extends perpendicularly or transversely to the longitudinal axis of bore 14. The projection provides for a mechanically coupled engagement with retainer 32. In the illustrated example, the projection extends from the gate element through a slot 36 (FIG. 4) disposed in valve body 12. The slot defines a path and range of travel for the gate element, in this example. The slot runs parallel to the longitudinal axis of bore 14 and opens to the bore. And, as the gate element moves in the slot, a portion of the gate element may be configured to fluidically seal the slot or to otherwise prevent liquid from passing the gate element and leaking from the slot.

The valve body may include spaced apart, opposed projections, e.g., a brackets, flange, tab, jut, or other projection, which are structurally part of or otherwise attached to the valve body. In the illustrated embodiment, retainer 32 is suspended on valve body 12 between a fixed projection 37 and a movable projection 39. As seen in FIGS. 1A-1B, the distal end portion 32A of the retainer is pressed against fixed valve-body projection 37. The proximal end portion 32B of the retainer is pressed against movable projection 34, which, in turn, is directly pressed against the proximal end of slot 36 and/or fixed valve-body proximal projection 39. Accordingly, the fixed projections 37 and 39 may serve as end stops for movable projection 34. Since the retainer 32 is fixedly (but removably) coupled to the valve body by a pair of opposing projections, it locks the actuator in its first position. In this embodiment, spring 28 is in a compressed state when the actuator is in the first position (FIG. 1A).

Retainer 32 is configured to undergo a structural transformation that releases the gate element 20 and actuator 24 from their respective first positions. For example, retainer 32 can be sacrificially deformed or destroyed in response to a signal corresponding to a trigger event. In one possibility, the retainer melts or sufficiently softens or deforms in response to a signal so that the spring energy stored in the actuator is released, allowing the actuator and gate elements to move into their second positions. The signal to the retainer can be delivered over known or to be discovered wired elements or wireless devices.

For example, the retainer body 35 (FIG. 2) is sufficiently rigid under normal conditions that it maintains the separation of projection 34 and valve-body projection 37 when gate element 20 and actuator 24 are in their first positions, which leave the valve open. A heating element 33 is contained in or alongside the retainer body, for example. When the heating element is heated to a predetermined temperature that is sufficient to cause a softening or melting of the retainer body, the retainer is weakened or destroyed such that the compressive force on the spring assembly is no longer held in a static condition. (Although not shown in the Figures, remnants of the retainer may remain on the valve.) When the retainer transforms, the spring decompresses, driving the assembly of shaft 25 and gate element 20 distally forward through bore 14, all into their respective second positions or conditions. As gate element 20 travels through bore 14, projection 34 moves away from valve-body projection 39 and travels through slot 36. Projection 34's travel is stopped by the distal end of the slot. In this example, projection 34 stops against distal valve-body projection 37. The compression spring 28 may be configured so that it does not fully decompress once the distal end 20A of the gate element engages outlet 18. Thereby, the spring provides a sufficient force to maintain sealing of the inlet 38 and/or outlet 40.

The retainer body 35 may be a thermoplastic material molded around heating element 33. The heating element can be based on resistive heating. For example, it may be a conductive wire that when supplied with sufficient current, resistively generates the heat needed to soften or melt the retainer body. When the retainer body sufficiently softens or melts, it can buckle or otherwise fail under the compressive load applied by the actuator. The retainer's body 35 can be any number of known thermoplastic materials or a metal with a low melting point. In one suitable embodiment, the retainer body includes a resistive heating element, such as an aluminum or steel wire. The heating element has differing poles at end portions 32A, 32B for electrically coupling with a power source. For example, it may have a positive terminal at one end and a ground terminal at the other end. The terminals may be connected to a power supply, such as AC or DC current. The power supply may be manually or automatically switched on in response to a predetermined trigger event like a leak in the system. Heating element 33 may be electrically coupled to a power supply and a controller or other switching means that provides a signal to the retainer. In this case, the signal is the current that causes the softening or melting of the retainer. Accordingly, transformable retainer 32 acts like a fuse whose sacrificial transformation triggers a closing of a fluid valve.

In this foregoing example, retainer 32 holds the actuator in compression and therefore is itself under compressive force. This occurs because projection 34, which is movably disposed on the assembly of actuator and gate element, transfers the compressive load from the actuator, through the retainer, to fixed, valve-body projection 37. In other embodiments, instead of externally extending projections, a projection could be structurally coupled to the retainer, and extend downwardly to and in engagement with the gate element and/or the actuator, to hold the actuator in a compressed condition. In an embodiment, the valve body lacks a slot, and the sacrificial element can be positioned within the valve body. For example, the valve body can define an inwardly extending protection or tab, and the sacrificial member can be positioned in a relief within the gate element.

In other embodiments, the retainer can be placed in a tensioned state when coupled to an actuator. For example, a valve similar to valve 10 could be arranged with gate element 20 disposed upstream of inlets or outlets, instead of downstream (FIGS. 1A-1D). If spring 28 is changed from a compression spring to an extension spring, and if movable projection 34 is relocated to the distal end portion 20A of the gate element and engaged with the distal end 32A of the retainer, the load on the retainer would be a tensioned load. When the retainer transforms, e.g., it sufficiently softens or melts, the lock or blocking of movable projection 34 would be overcome, allowing the extended spring to drive the gate element proximally rearward, closing the inlet and/or outlet.

Figure 1D:
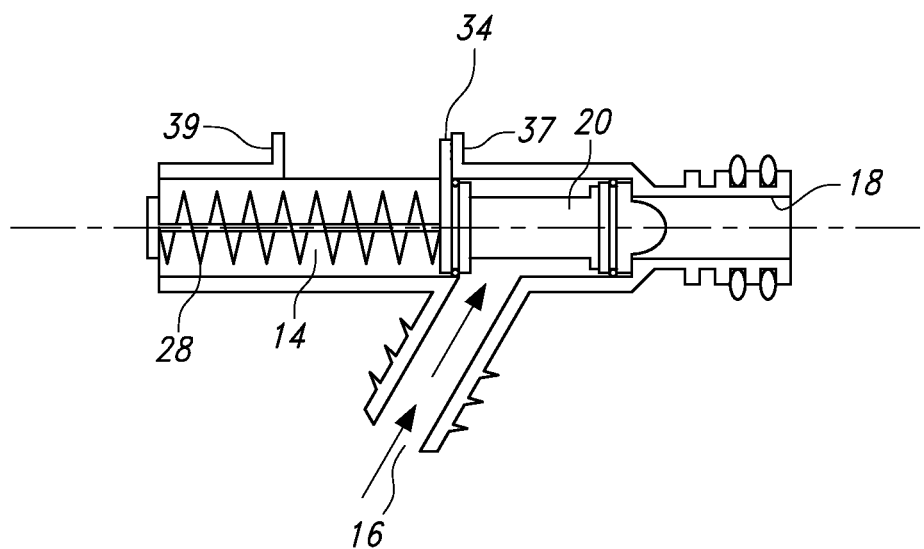
FIG. 1D is the same as FIG. 1C but with the gate element in the valve positioned so as to leave the valve in a closed condition.
Figure 2:
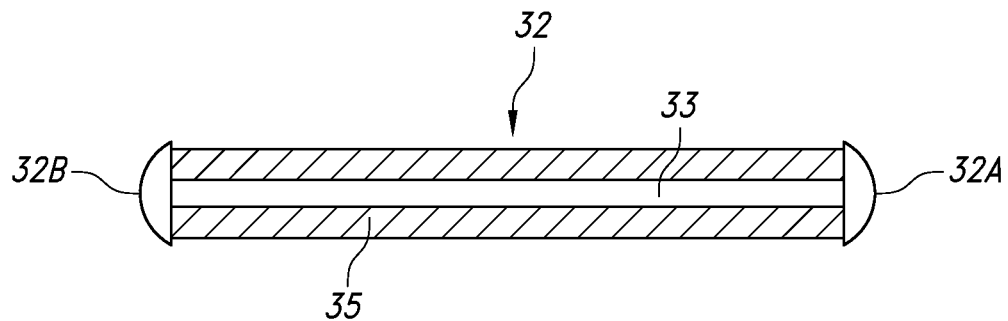
FIG. 2 schematically illustrates an elevational cross-section of a retainer portion of the fluid fuse of the valve of FIG. 1A.
Figure 3:
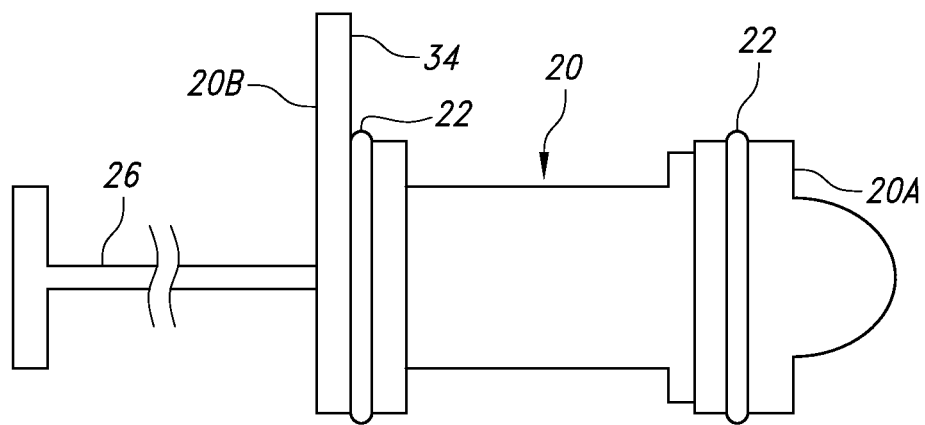
FIG. 3 schematically illustrates an elevational cross-section of a gate element of the valve of FIG. 1.
Figure 4:
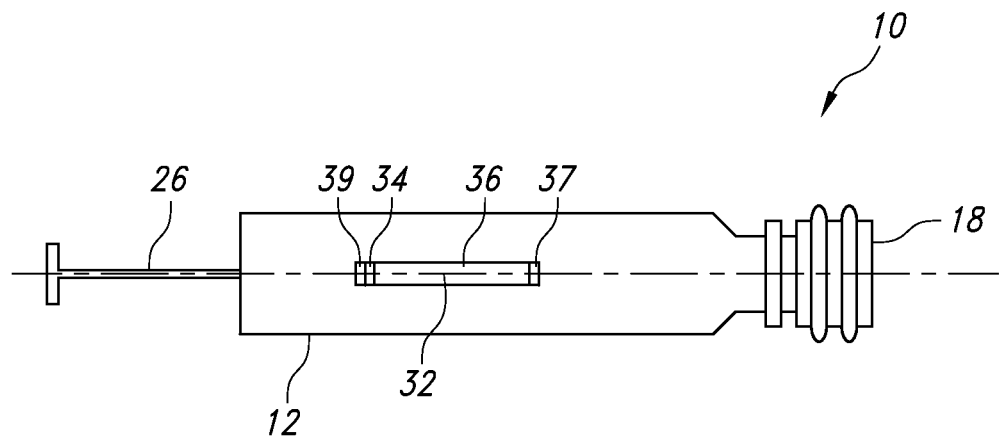
FIG. 4 is a top view of the valve of FIG. 1A.

In another example, an elongate retainer like retainer 32 in FIG. 1A need not be used. For example, FIGS. 1C-1D, show an embodiment similar to the embodiment of FIGS. 1A-1B, except that a retainer in the form of an elongate member is eliminated. Instead, in a first, open-valve position, spring 28 is compressed, with movable projection 34 positioned against projection 39. A retainer element or mechanism 132 locks the projections together or otherwise retains the gate element in its first position despite the load applied by the actuator that moves the gate element away from its first position and toward its second position, keeping the spring compressed and the valve in the open position (FIG. 1C). Projections 34 and 37 are therefore held by a retainer placed in tension. On a trigger event, the retainer element 132 is sacrificed, or the mechanism releases the engaged projections, causing spring 28 to decompress and move gate element 20 into a forward, second position that closes the valve, as seen in FIG. 1D.

The retainer 132 that couples the projections may be disposed over and/or between the projections. It could be layer of a fusible material such as metallic solder or a thermoplastic that is embedded with, or otherwise associated with, conductive wires or materials. Each projection 34, 37 could have conductive aspects that couple with different poles of an electrical power source such that a trigger event causes the power source to activate and melt or soften the retainer 132 sufficiently to release the projections. In other embodiments, one or both projections are made at least in part of a fusible material that interconnects the projections and which are similarly coupled to a power source so that a trigger event activates a power source, causing the projections to release from one another. In such cases, the retainer can be considered to be integrated with the projections. As another possibility, the projections could be ferromagnetic materials that engage or disengage electromagnetically on a trigger event.

The valve body 10 may be made from materials known to be suitable for forming valves. For example, it may be machined from aircraft grade aluminum alloy stock although many other materials could be used such as acrylic and other types of plastic, brass, stainless steel and other metal alloys. The inlet portion 38 and outlet portion 40 of the valve body may have external surfaces that facilitate sealingly coupling with other components of a fluid flow system. For example, the inlet portion and outlet portions may have barbed or threaded surfaces for coupling to other elements, such as conduits, pumps, etc.

While this disclosure may use a certain plug valve as a representative valve, the innovative principles of the disclosure may apply to a variety of mechanical fluid flow rate regulating or controlling valves, including butterfly valves, ball valves, gate valves, etc. All such valves have a gate element that is movable from a first position where flow is permitted to a second position where flow is blocked or restricted.

Fluid Flow System Overview

Figure 5:
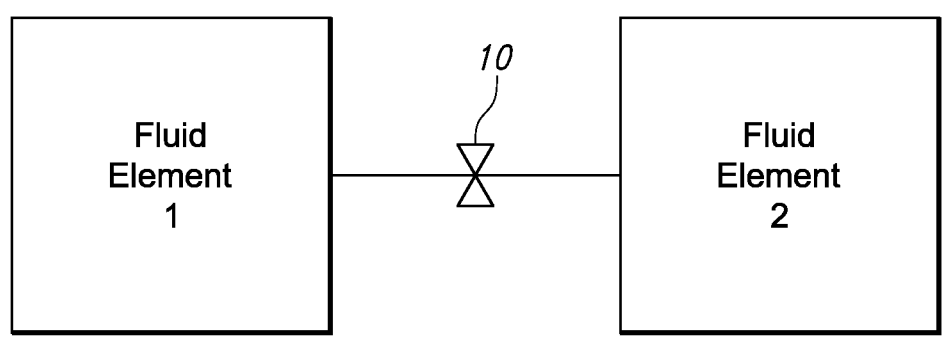
FIG. 5 is a block diagram of a valve (schematic) with a fluid fuse integrated into a basic fluid flow system.

The innovative fuse valves may be used to control fluid flow in any fluid flow system. FIG. 5 schematically shows valve 10 fluidically coupled between first and second fluid system elements. The elements can be conduits, pumps, vessels, mechanical systems, heat sinks, fluid to heat-exchanger, fluid reservoirs, other valves, etc. Fluid flow systems that may include an innovative valve include cooling systems, heating systems, fluid transfer systems (e.g., for transferring reagents in a chemical plant), irrigation systems, plumbing systems, fire suppression systems, hydraulic systems for machinery. The following is a disclosure of representative systems and system features in which the innovative fuse valves of this disclosure may be used. The innovative fuse valve may be incorporated in fluid path within or between any component contemplated for the systems and system features discussed below.

Figure 6A:
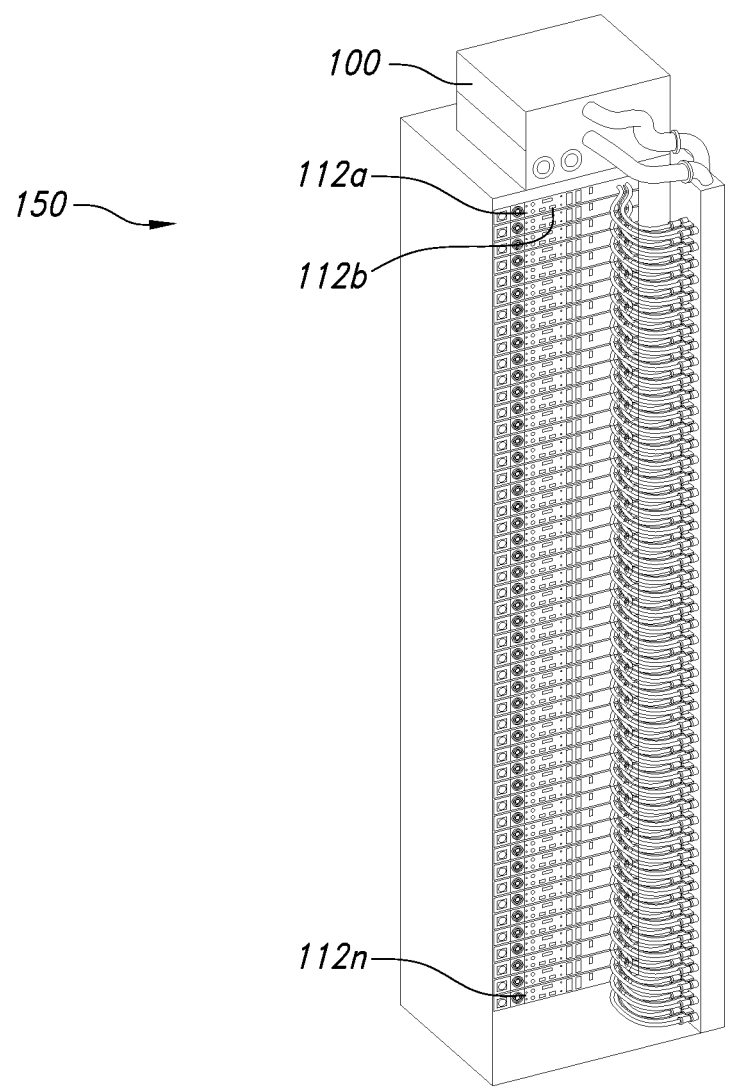
FIG. 6A illustrates a modular heat-transfer system configured to cool a plurality of independently operable, rack-mounted servers.
Figure 6B:
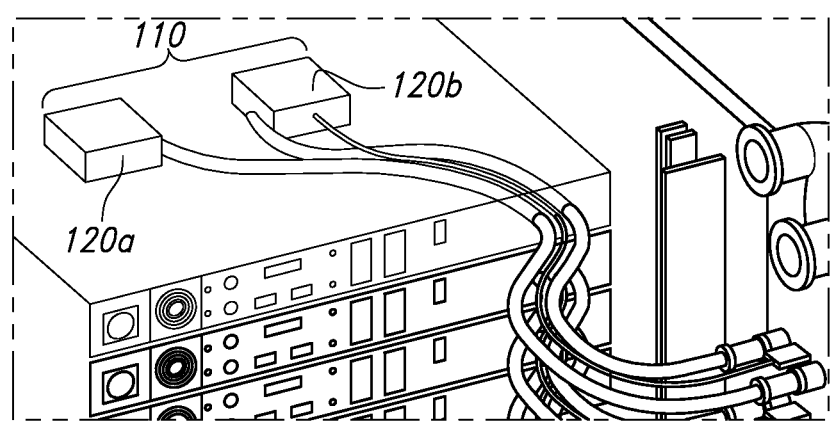
FIG. 6B shows an isometric view of a portion of the modular heat-transfer system shown in FIG. 6A, together with features of a heat-transfer element.

FIGS. 6A-6B illustrate aspects of a representative fluid-based, heat-transfer system for a rack of servers. FIG. 6A shows an array 150 of independently operable servers 112*a*, 112*b* . . . 112*n* mounted in a rack, or chassis, including aspects of a heat-transfer system described below. In FIG. 6B, each server 112 has one or more corresponding heat sources, which convert electrical energy to thermal energy (i.e., resistive heating). A heat-transfer system can collect heat from each heat source and convey the heat to a suitable heat exchanger, e.g., a heat sink and/or a facility liquid and/or air in a conditioned room containing the rack of servers. Such a heat-transfer system can include several different components arranged to dissipate heat from any of a variety of heat sources to one or more heat exchangers. As used herein, a "heat exchanger" is an active or passive device or system used to transfer heat between two or more fluids. In other words, heat exchangers pertain to cooling and/or heating processes. The fluids in a heat exchange system may be separated by a solid wall to prevent mixing, or they may be in direct contact. A heat sink is an example of a passive heat exchanger. As used herein, a "heat sink" is a passive heat exchanger that transfers the heat generated by an electronic or a mechanical device to a fluid medium, often air or a liquid coolant, where it is dissipated away from the device. One example of a heat sink is a thermally conductive metal structure having a base and a plurality of extending fins define channels therebetween and through which gas and liquid may flow.

A heat-transfer element 110 is an example of an active heat exchanger, which may be associated with each of servers 112*a-n*, as indicated in FIG. 6B. FIG. 6B shows one such element that may be disposed inside one of the servers in the rack. The heat-transfer element 110 can be thermally coupled to a corresponding one or more components that dissipate(s) heat during operation of the respective server. The components of the heat-transfer element may optionally include a heat sink and optionally a pump for moving coolant through the heat-transfer element. In FIG. 6B, the heat-transfer element 110 has two constituent component heat-exchange modules 120*a*, 120*b*, although in other embodiments, a single module or more than two modules may be in place. The modules may include active and passive heat exchangers or elements thereof. Each module is a self-contained unit that has a housing that includes a heat sink, e.g., a finned thermally conductive metal structure, section of conduit that are thermally coupled to the heat sink, optionally a pump contained in the housing and operatively coupled with the conduit. Each module can be directly or indirectly thermally coupled with one or more corresponding heat-dissipation (i.e., a heat source) element (e.g., a processing unit) within the server 112 or a rack of servers. For example, the modules may have inlets and outlets fluidically coupled to the internal conduits. The inlets and outlets fluidically couple with fluids that thermally couple to the heat dissipater. As fluid passes through a heat-transfer module, there is heat transfer between the fluid and heat exchange elements of the module. For example, to dissipate heat from the system, warmed coolant may be carried from an outlet of a module 120 to the fluid-conditioning unit 100 (FIG. 6A), where the heat is transferred to another medium (e.g., facility water). Such an arrangement for cooling rack mounted servers is described in further detail in U.S. Pat. No. 9,496,200, which is hereby incorporated by reference. It should be appreciated that conduits associated with a fluid-conditioning unit can be directly or indirectly thermally coupled to one or more heat-collection elements to carry heat away from heat-dissipation element. In other words, a heat transfer element may be omitted from the system. In summary, the heat collection can occur through heat transfer elements and/or a fluid conditioning unit. Fluid control valves of the type described above can be incorporated between any flow or heat transfer devices in FIGS. 6A and 6B, as depicted in FIG. 5.

Figure 7:
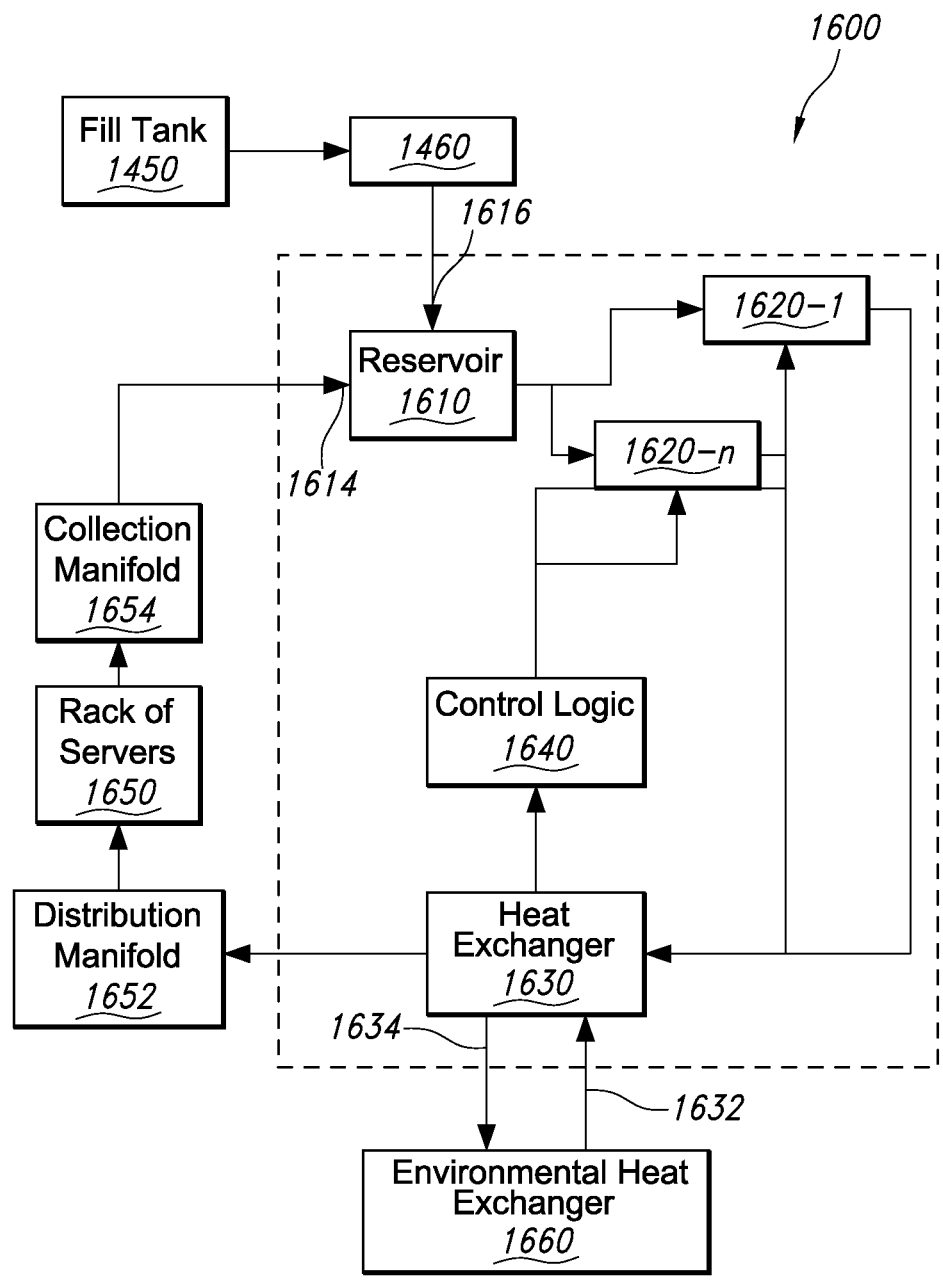
FIG. 7 shows a block diagram of a liquid-cooled heat exchange system configured to cool servers in a rack-mountable server system.

FIG. 7 schematically illustrates a cooling system suitable for cooling an array of rack mounted servers 1650, like the rack mounted servers 150 in FIGS. 1A and 1B. In FIG. 7, the fluid conditioning unit 1600 includes a reservoir 1610 and a plurality of distribution pumps 1620-1 to 1620-*n*. Coolant collected from the rack of servers 1650 (e.g., by a collection manifold 1654) can flow into the reservoir 1610 and can be pumped by the distribution pump(s) 1620-1 to 1620-*n* to an environmental coupler (e.g., a heat exchanger 1630). In the environmental coupler, heat carried by the coolant can be transferred to another medium (e.g., facility water), cooling the coolant. The cooled coolant can then pass back to the rack of servers 1650 (e.g., distributed among the plurality of servers in the rack by the distribution manifold 1652). In FIG. 7, the fluid conditioning unit 1600 includes control logic 1640.

A heat-transfer element or a fluid conditioning unit (which may also be referred to as a coolant distributer) can have a variety of temperature, flow-rate, and/or pressure sensors arranged to observe temperature, flow-rate and pressure (e.g., static and/or stagnation) at one or more selected locations within a fluid circuit (open or closed). A controller can adjust operation of one or more coolant (e.g., a pump, a valve) and/or heat-transfer components (e.g., a logic or other component of a computing environment) to achieve desired flow and/or cooling characteristics.

As but one example, if a static pressure difference across an inlet to and an outlet from a selected fluid circuit (or branch thereof) exceeds a selected upper threshold pressure, one or more pumps can be throttled, as by slowing an impeller speed, thereby reducing the static pressure difference across the inlet and the outlet. Alternatively, if the static pressure difference across the inlet and the outlet falls below a selected lower threshold pressure difference, the one or more pumps can be operated at a higher impeller speed and/or one or more additional pumps can be "brought online" to supplement or augment available pressure head and flow delivery.

As another example, measurement of observable state-variables (e.g., temperature, static pressure, mass, density) combined with known measures of selected properties (e.g., specific heat, heat capacity, compressibility, gas constant, equation-of-state) of a given fluid and/or observable system performance characteristics (e.g., power dissipation from a heat source), health and robustness of system sensors can be accessed and communicated to a system user or manager. For example, some disclosed systems, controllers and methods can compute values of state variables at one or more selected locations within a selected fluid circuit (or branch thereof) and compare the computed value to an observed value detected from a given sensor.

Figure 8:
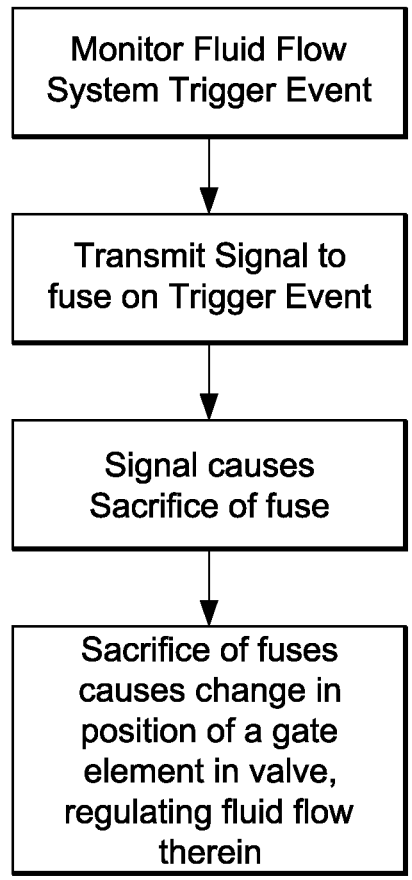
FIG. 8 is a block diagram of one possible embodiment of steps for regulating fluid flow in a fluid flow system using a valve with a fluid fuse based on a trigger event.

If an absolute value of a difference between the computed value and the observed value exceeds a selected threshold difference, an innovative system, controller or method can determine a fault or other trigger event has occurred and can take a remedial action, as by setting a flag, sending an e-mail, and/or initiating an alarm to alert a user of the determined fault. Such a fault can indicate a failed or failing sensor, a leak, an over temperature condition, a failed pump, an under-speed pump, an over-speed pump, a failed or failing controller (e.g., a pump controller). By electrically coupling the controller to an innovative valve, such as valve 10, the valve can react to a signal and block or restrict fluid flow through the valve. As discussed earlier, the signal may be in the form of current that is supplied to a heating element in retainer 32, softening or melting the retainer so that it transforms and causes the valve gate element 20 to move from a first position to a second position. The change in position can represent a closing or an opening of the valve, e.g., the change in positions shown in FIGS. 1A and 1B. As a general summary, FIG. 8 is a block diagram of steps for regulating fluid flow in a fluid flow system using a valve with a fluid fuse based on a trigger event.

Disclosed systems, controllers and methods also may provide for automatic control of external fill systems. For example, a disclosed coolant distributer can have a relay or other control output to cause an external pump (e.g., a pump associated with an external fill kit) to actuate in correspondence with a pump associated with the coolant distributer. The relay or other control output can be actuated responsive to an observed and/or computed state of a coolant circuit (or branch thereof). For example, a bleed-valve can be opened to permit a compressible gas escape from a conduit as the conduit fills with a coolant fluid (e.g., a substantially incompressible liquid). A fluid sensor or a leak detector can determine the conduit is full, as when a selected measure of the fluid is detected within or without the conduit. Responsive to such detection, the relay or other control output can cause the external pump to slow or cease operation, to speed up or increase operation, can open or close a selected valve, and/or cause an internal pump to slow, cease operation, speed up, or increase operation to achieve a desired outcome. The selected valve can be any of the innovative fuse valves disclosed herein.

Couplers

Figure 9:
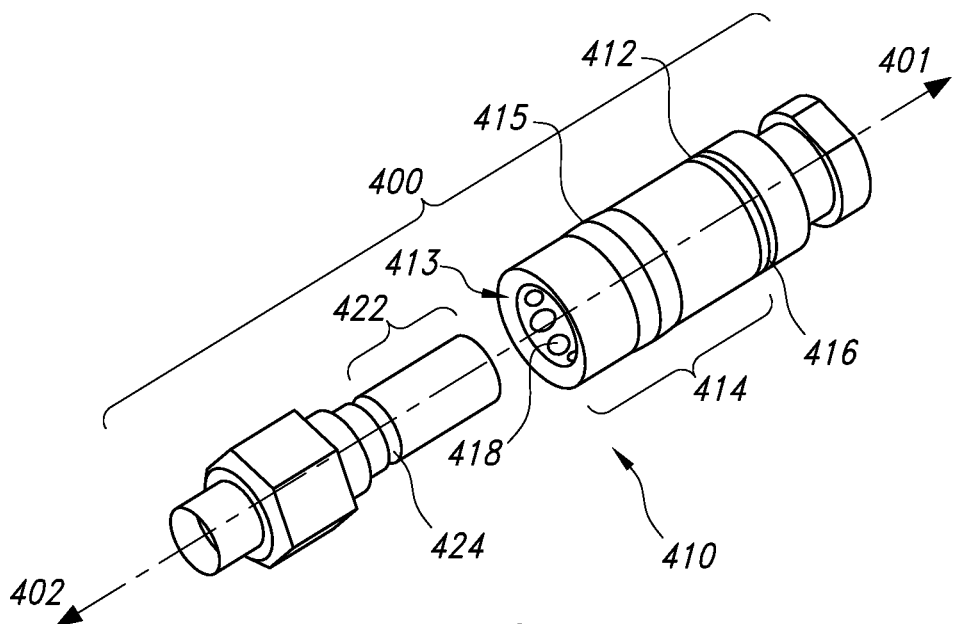
FIG. 9 illustrates a coupler of a type disclosed herein.

The innovative valves of this disclosure may be coupled with couplers that may be, in turn, coupled to other system components. FIG. 9 illustrates one embodiment of a two-member coupler. The fluid coupler 400 has a first member 410 configured to matingly couple with and to decouple from a second member 420 to provide a decoupleable coupling between a corresponding first fluid conduit 401 and a corresponding second fluid conduit 402. Such a coupling is depicted, for example, schematically at inlets 150*a-n* and outlets 140*a-n* in FIG. 6 in U.S. patent application Ser. No. 13/559,340. To inhibit a leak of fluid from the coupler 400 when coupling or decoupling the first and the second members 410, 420 to or from each other, one or both of the members 410, 420 can have an internal valve that automatically closes before, during or after the members 410, 420 are decoupled from each other and automatically opens before, during or after the members are coupled to each other.

Looking more particularly at coupler 400, first member 410 can define an open interior bore 413 sized to receive a shank 422 extending from the second member 420. Either or both members 410, 420 can define an interior valve that opens after the bore 413 matingly and/or sealingly engages the shank 422. For example, an interior wall of the bore 413 can have a pliable gasket (e.g., an O-ring) extending circumferentially around the bore and positioned at a selected first depth within the bore. The gasket can be configured relative to the shank (e.g., a diameter thereof) to sealingly engage with an outer surface of the shank 422 as the shank slides into the bore 413 to a depth greater than the selected first depth. As the shank slides deeper into the bore, a portion within the bore 413 can urge against a portion of the shank to open either or both valves corresponding to the respective members 410, 420 and thereby to fluidically couple the first conduit 401 with the second conduit 402.

Such automatic actuation of the valves can result from a resiliently compressible member (e.g., a spring, not shown). For example, the valve can be closed in an "at-rest" position when urged by a corresponding resiliently compressible member. The coupling members 410, 420 can define correspondingly configured features that urge the valve open against the force applied by the resiliently compressible member as the members 410, 420 are brought into a mating engagement. With such an automatically actuatable valve, the coupler members 410, 420 can inhibit fluid leaks when coupling or decoupling the coupler members 410, 420.

As well, a compressive force applied between the members 410, 420 that actuates the valve by overcoming a force of a resilient member, as just described, can compress such a resilient member. The compressed resilient member can urge the members 410, 420 apart from each other when the compressive force is removed.

However, the coupler 400 can also have a retainer configured to retain the decoupleable coupling between the first member 410 and the second member 420 against the outwardly applied force of the compressed resilient member. However, when a retention force applied by the retainer to the first and the second members 410, 420, the compressed resilient member can urge the first member 410 and the second member 420 apart with sufficient force as to cause the coupled members 410, 420 to decouple from each other and thereby to automatically close the respective valves.

The retainer depicted in FIG. 9 includes a cylindrical sleeve 414 overlying a body 412 of the first member 410, a plurality of bearings positioned at discrete circumferential positions relative to the bore 413, as well as a groove 424 positioned proximally of the shank 422 of the second member 420. When the first and the second members 410, 420 are matingly engaged with each other, the bearings 418 rest within the groove 424. The wall of the groove urges against the bearings when the mated first and the second members 410, 420 are urged together in compression or pulled apart in tension, and the sleeve 414 overlying the bearings prevents the bearings 418 from moving radially outward from the bore 413, locking the first and the second members 41, 420 together.

The sleeve 414 can slide longitudinally to and fro relative to the body 412 from a retention configuration, as shown in FIG. 9 to an engagement/disengagement configuration (not shown). In the engagement/disengagement configuration, the sleeve 414 longitudinally retracts from the depicted retention configuration until the sleeve urges against a shoulder 416 defined by the body 412. When the sleeve 414 is retracted, the bearings 418 can move radially outward relative to the bore 413, allowing the members 410, 420 to separate from each other as they are pulled apart.

The illustrated sleeve defines an outer surface and a circumferentially extending groove recessed from the outer surface. The groove facilitates gripping by a user's hand when retracting the sleeve 414 relative to the body 412. As well, the coupler member 410 includes a resilient member (e.g., a spring, not shown) configured to resiliently urge the sleeve 414 toward the retention configuration shown in FIG. 9. To retract the sleeve to the engagement/disengagement configuration, the force of the resilient spring and any friction as between the sleeve and the body 412 needs to be overcome. Once the sleeve is partially or fully retracted from the illustrated retention configuration, the resilient member urges the sleeve 414 toward the retention configuration. In many embodiments, the force applied to the sleeve by the resilient member sufficiently exceeds any frictional force between the sleeve 414 and the body 412 to allow the sleeve 414 to automatically return to the illustrated retention configuration. As described more fully below, the force applied to the sleeve 414 by the resilient member sufficiently exceeds such frictional forces as well as other forces, e.g., servo or other actuator resistance when the servo or other actuator is not actuated.

Actuators

Any set of couplings in a disclosed or contemplated system may be mechanically associated with actuators that can couple or decouple a set of coupler members. Such actuators may be manually or automatically activated to effect such coupling and/or decoupling. For example, the actuators may be activated responsively to an alert or a command received from a controller. Responsive to such an alert or a command, one or more electro-mechanical actuators, such as, for example, a linear or a rotary servo- or stepper-motor, can urge or pull against a linkage or other member arranged to terminate a fluid flow through a conduit, a channel, or other flow path. In particular examples, such an electro-mechanical actuator can cause one or more valves to open or to close or cause a pair of matingly engaged couplers (sometimes referred to in the art as, for example, a "dripless quick-connect" or a "quick-disconnect") to decouple from each other.

A sensor can be configured to detect a presence of the working fluid externally of the branch, and an electro-mechanical actuator can be configured to fluidly isolate the branch from the fluid circuit responsive to a detected presence of the working fluid externally of the branch.

The electro-mechanical actuator can be actuatable responsive to the signal. The electro-mechanical actuator can be configured to close one or more valves and/or to decouple matingly engaged members of a fluid coupling. For example, a linkage can couple the electromechanical actuator to one or more of the valves and/or to a movable portion of the matingly engaged members.

In other instances, such a relay can close a circuit to activate an electro-mechanical actuator of the type described herein, e.g., to physically disconnect or to otherwise isolate a branch of a fluid circuit of a heat-transfer system.

A servo, a stepper-motor, or other electro-mechanical actuator (not shown) can urge an actuator shaft or other linkage to translate in space from a first position to a second position.

Any actuator suitable to retract one or more sleeves can be used. Examples of suitable actuators include linear motors, linear servos, ball-screws coupled with a rotary motor or servo, four-bar linkages, among other types of linear actuators configured to urge the actuator shaft through a range of motion sufficient to retract one or more sleeves.

Other arrangements of actuators and couplers are possible. For example, the couplers described thus far are couplable and decouplable by sliding a sleeve in a longitudinal direction. However, some couplers are configured to decouple only after a member (e.g., a sleeve) rotates through a selected angle. In such an embodiment, a rotational actuator, stepper motor, or servo can be coupled to the rotatable member to automatically decouple the coupler. In still other embodiments, the coupler can require a combination of linear and rotational movement to automatically decouple the coupler. In such an embodiment, a two-degree-of-freedom actuator (e.g., an actuator or combination of actuators configured to urge a member in rotation and in linear translation) can be coupled to the coupler to automatically decouple the coupler.

Various coupling members, and actuators associated with sets of coupler members, are disclosed in US20170068258, which is hereby incorporated by reference in its entirety for all purposes.

Self-Diagnosis

As yet another example a number of sensors may be arranged throughout the system and may measure selected physical characteristics of, for example, a coolant flowing among a plurality of rack mounted servers and a fluid conditioning unit. A number of other sensors arranged throughout, e.g., a rack of servers, also may measure selected physical characteristics of components that interact with the heat transfer system. Such characteristics may include, without limitation, processor power dissipation (e.g., energy per unit time). A physical model may describe an inter-relation between or among such physical characteristics, as through an equation of state. Consequently, measurements of selected physical quantities by selected sensors can be input into a model (e.g., an equation of state) and that model can predict values of selected physical quantities, e.g., at a selected position within the heat-transfer system. Control logic can implement such modeling technologies.

Predictions of selected physical quantities can be compared to measurements of those physical quantities. If the prediction falls within a selected threshold difference from the measured quantity (or vice-versa), the sensor that observed the measured quantity may be assumed to be in good working order. However, a failing or a failed sensor may be identified if the prediction differs from the measured quantity by more than a selected threshold difference. For example, one of the sensors used to generate the prediction and/or the sensor used to observe the physical quantity to which the prediction is compared may be faulty. By inputting a quantity measured by a faulty sensor to an equation of state or a comparison to a predicted value of a state variable, the predicted value and the measured value likely will differ by more than a selected threshold difference. Such a difference may give rise to a presumption that a sensor is faulty. Further comparison among predicted and observed values throughout the system can be used to identify which sensor(s) may be faulty. Control logic can implement such comparison technologies.

Prediction and comparison technologies described herein can allow system components, including, by way of example and not limitation, fluid conditioning units to "self diagnose" system and component health. For example, a failing pump, a leak, an excessive heat-dissipation, a poor thermal coupling, and any of a variety of other system degradations or faults may be identified with techniques described herein. Control logic can implement such self-diagnosis technologies. Moreover, when a fault or other degradation, i.e., a trigger event, is determined, control or other logic can emit a flag or otherwise emit an alert or other signal indicating the presence of the fault or other degradation.

By way of further explanation, an equation of state is a thermodynamic equation relating state variables of matter, which describe the state of a given substance under a given set of physical conditions. For example, pressure (p), volume (V), and temperature (T) are state variables, as is internal energy. Many state variables are known, and each quantifies a respective characteristic of matter throughout the various thermodynamic states of that matter. In general, equations of state are useful for describing properties of matter, including fluids, mixtures of fluids, and solids.

As a general principle, pressure, volume and temperature for a given amount of matter are not independent of each other. Rather, they are linked by a relationship generally of the form $f(p,V,T)=0$. An equation used to model that relationship is generally referred to in the art as an equation of state.

Many equations of state have been developed and may be used in connection with technologies described herein. One useful equation of state used to model so-called "incompressible liquids" is V=constant. Stated differently, the general form of the equation of state can be reduced to a two-variable equation of state: $f(p,T)=0$ when the volume of a given substance (e.g., an "incompressible" liquid) remains constant, or approximately constant over a selected range of temperatures and a selected range of pressures. Coolants of the type described herein, in their liquid phase, typically can be reliably modeled as being incompressible. Nonetheless, technologies described herein are not limited solely to incompressible liquids. Rather, technologies described herein can be applied to incompressible and compressible fluids, and saturated mixtures thereof, as well as solids and saturated solid-liquid mixtures.

For example, a variety of temperature, flow-rate, and/or pressure sensors can be arranged within any of the heat-transfer systems (and components thereof) described herein. Such sensors can be arranged to observe, for example, temperature, flow-rate and pressure (e.g., static and/or stagnation) at one or more selected locations within a fluid circuit (open or closed), or any other physical characteristic pertaining to a thermodynamic state of a substance in the heat-transfer system. A controller (e.g., control logic) can adjust operation of one or more coolant (e.g., a pump, a valve) and/or heat-transfer components (e.g., a logic or other component of a computing environment) to achieve desired flow and/or cooling characteristics within the heat-transfer system.

As another example, measurement of observable state-variables (e.g., temperature, static pressure, mass, density) combined with known measures of selected properties (e.g., specific heat, heat capacity, compressibility, gas constant, equation-of-state) of a given fluid and/or observable system performance characteristics (e.g., power dissipation from a heat source), health and robustness of system sensors can be assessed and communicated to a system user or manager. For example, some disclosed systems, controllers and methods can compute values of state variables at one or more selected locations within a selected fluid circuit (or branch thereof) and compare the computed value to an observed value detected from a given sensor.

If an absolute value of a difference between the computed value and the observed value exceeds a selected threshold difference, an innovative system, controller or method can determine a fault or other trigger event has occurred and can take a remedial action, as by setting a flag, sending an e-mail, and/or initiating an alarm to alert a user of the determined fault. Such a fault or other trigger event can indicate a failed or failing sensor, a leak, an over temperature condition, a failed pump, an under-speed pump, an over-speed pump, a failed or failing controller. In response to a self-diagnosed or other trigger event, the system may send a signal to a valve to control fluid flow in a predetermined manner. The signal can be sent to any one or more of the innovative fuse valves disclosed herein, which are in a fluid path in the system.

Computing Environments

Figure 10:
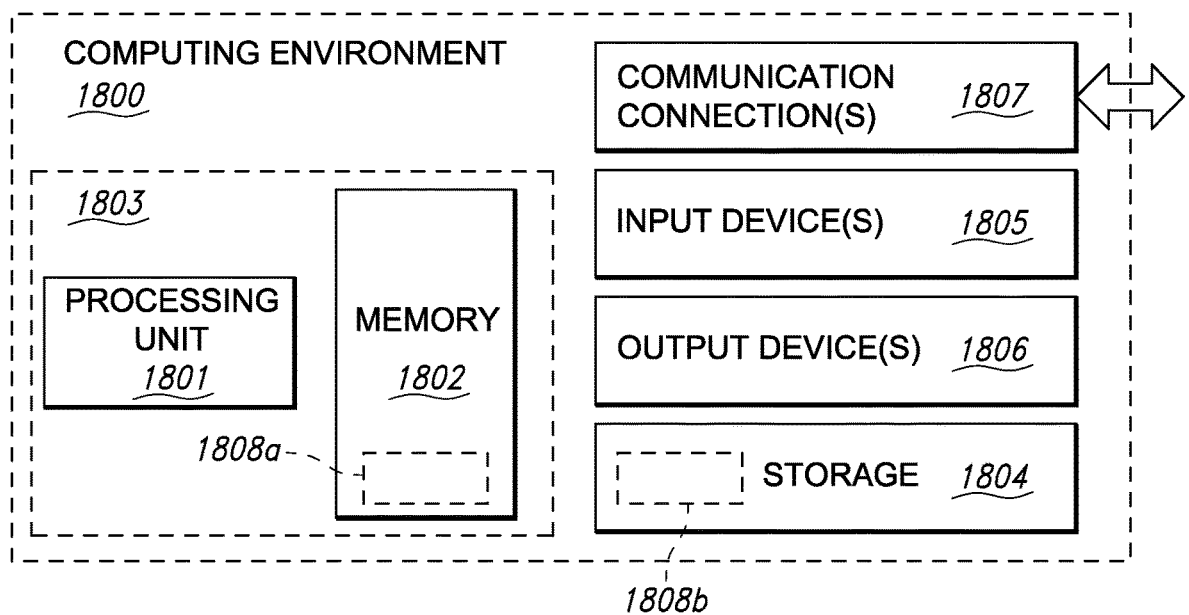
FIG. 10 illustrates a generalized example of a suitable computing environment for implementing one or more technologies described herein.

FIG. 10 illustrates a generalized example of a suitable computing environment 1800 in which described methods, embodiments, techniques, and technologies relating, for example, to control of a filling operation and other system control for a liquid-filled closed loop system. The computing environment 1800 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices, multiprocessor systems, microprocessor-based or programmable consumer electronics, embedded platforms, network computers, mini-computers, mainframe computers, smartphones, tablet computers, data centers, audio devices, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 1800 includes at least one central processing unit 1810 and memory 1802. In FIG. 10, this most basic configuration 1803 is included within a dashed line and may represent the control logic, e.g., control logic 1440, 1540, or 1640. The central processing unit 1810 executes computer-executable instructions and may be a real or a virtual processor. In a multi-processing system, multiple processing units execute computer-executable instructions to increase processing power and as such, multiple processors can run simultaneously. The memory 1802 may be volatile memory (e.g., registers, cache, RAM), non-volatile memory (e.g., ROM, EEPROM, flash memory, etc.), or some combination of the two. The memory 1802 stores software 1808a that can, for example, implement one or more of the innovative technologies described herein, when executed by a processor.

A computing environment may have additional features. For example, the computing environment 1800 may include storage 1804, one or more input devices 1805, one or more output devices 1806, and one or more communication connections 1807. An interconnection mechanism (not shown) such as a bus, a controller, or a network, interconnects the components of the computing environment 1800. Typically, operating system software (not shown) provides an operating environment for other software executing in the computing environment 1800, and coordinates activities of the components of the computing environment 1800.

The store 1804 may be removable or non-removable, and can include selected forms of machine-readable media. In general, machine-readable media include magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and that can be accessed within the computing environment 1800. The storage 1804 stores instructions for the software 1808b, which can implement technologies described herein.

The storage 1804 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hard-wired circuit components.

The input device(s) 1805 may be a touch input device, such as a keyboard, keypad, mouse, pen, touchscreen, touch pad, or trackball, a voice input device, a scanning device, or another device, that provides input to the computing environment 1800.

The output device(s) 1806 may be a display, printer, speaker transducer, DVD-writer, or another device that provides output from the computing environment 1800.

The communication connection(s) 1807 enable communication over a communication medium (e.g., a connecting network) to another computing entity. The communication medium conveys information such as computer-executable instructions, compressed graphics information, processed signal information (including processed audio signals), or other data in a modulated data signal.

Thus, disclosed computing environments are suitable for performing disclosed orientation estimation and audio rendering processes as disclosed herein.

Machine-readable media are any available media that can be accessed within a computing environment 1800. By way of example, and not limitation, with the computing environment 1800, machine-readable media include memory 1802, storage 1804, communication media (not shown), and combinations of any of the above. Tangible machine-readable (or computer-readable) media exclude transitory signals.

As explained above, some disclosed principles can be embodied in a tangible, non-transitory machine-readable medium (such as microelectronic memory) having stored thereon instructions, which program one or more data processing components (generically referred to here as a "processor") to perform the digital signal processing operations of the control logic described above including estimating, adapting, computing, calculating, measuring, adjusting, sensing, measuring, filtering, addition, subtraction, inversion, comparisons, and decision making. In other embodiments, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

Other Exemplary Embodiments

Directions and references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of cooling systems, controllers and methods that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Those of ordinary skill in the art will appreciate that the exemplary embodiments disclosed herein can be adapted to various configurations and/or uses without departing from the disclosed principles. For example, the principles described above in connection with any particular example can be combined with the principles described in connection with another example described herein. Various modifications to those embodiments will be readily apparent to those skilled in the art, and the generic principles defined herein may be applied to other embodiments without departing from the spirit or scope of this disclosure. Accordingly, this detailed description shall not be construed in a limiting sense, and following a review of this disclosure, those of ordinary skill in the art will appreciate the wide variety of filtering and computational techniques can be devised using the various concepts described herein.

Similarly, the presently disclosed inventive concepts are not intended to be limited to the embodiments shown herein, but are to be accorded their full scope consistent with the principles underlying disclosed concepts, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

Thus, in view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

I claim:

1. A fluid-flow control system, comprising:
   a valve comprising:
      a valve body having a bore for flowing fluid from an inlet port to an outlet port, the inlet and outlet ports, and the bore therebetween, defining a fluid flow path through the valve body;
      a gate element disposed in the bore and being positionable in the bore from a first position which allows fluid flow through the bore to a second position which restricts fluid flow through the bore;
      an actuator coupled to the gate element for moving the gate element between the first and second positions, the actuator moving from a first position to a second position to effect the movement; and
      a fuse comprising a transformable retainer that is selectably coupled to the actuator, the coupled retainer maintaining the actuator in its first position in a first condition but facilitating the release of the actuator to its second position on transforming to a second condition in response to a signal;

the fluid-flow control system further comprising one or more heat-exchange modules fluidically coupled with the valve, each heat exchange module being thermally coupleable to one or more processing units included in a rack of servers.

2. The system of claim 1, wherein each heat exchange module includes a pump for moving a heat-exchange fluid through the module.

3. The system of claim 1, wherein the retainer is configured to transform from a rigid form to a softened or melted form in response to a signal.

4. The system of claim 3, wherein the retainer comprises a thermoplastic material overmolded on a metal that serves as the heating element.

5. The system of claim 3, wherein the retainer comprises a meltable metal that serves both to retain the actuator and as a heating element that is a resistive heater.

6. The system of claim 1, wherein the retainer comprises a thermoplastic material that is configured to transform from a rigid form to a softened or melted form in response to a signal.

7. The system of claim 6, wherein the valve further includes a heating element associated with the retainer that can heat and cause the transformation of the thermoplastic material in response to a signal.

8. The system of claim 1, wherein the retainer comprises a metal material that is configured to transform from a rigid form to a softened or melted form in response to a signal.

9. The system of claim 8, wherein the valve further includes a heating element associated with the retainer that can heat and cause the transformation of the metal material in response to a signal.

10. The system of claim 1, wherein the actuator comprises a spring that moves the gate element from the first position to the second position on transformation of the retainer, and wherein the spring comprises a compression spring that moves the gate element from the first position to the second position, as the spring decompresses on transformation of the retainer.

11. The system of claim 1, wherein the actuator comprises a spring that moves the gate element from the first position to the second position on transformation of the retainer, and wherein the spring comprises an extension spring that moves the gate element from the first position to the second position, as the spring retracts on transformation of the retainer.

12. The system of claim 1, further comprising a controller that is configured to send the signal to the fuse on a predetermined trigger event.

13. The system of claim 12, wherein the controller is configured to send the signal to the fuse based on the system sensing a predetermined change in a fluid flow condition in the system.

14. The system of claim 13, wherein the change in condition is indicative of a fluid leak in the system.

15. The valve of claim 1, wherein the transformable retainer is mounted between a first movable projection and a second fixed projection, the first projection being mechanically coupled to the actuator such that spring is maintained in a loaded state until the retainer is transformed in response to a trigger event, the transformation of the retainer freeing the actuator to move from its first position to its second position.

16. The system of claim 1, wherein the actuator comprises a spring that moves the gate element from the first position to the second position on transformation of the retainer, and wherein the spring comprises a compression or an extension spring that moves the gate element from the first position to the second position, as the spring relaxes on transformation of the retainer; and wherein the transformable retainer is mounted between a first movable projection and a second fixed projection, the first movable projection being mechanically coupled to the actuator such that spring is maintained in a loaded state until the retainer is transformed in response to a trigger event, the transformation of the retainer freeing the actuator to move from its first position to its second position.

17. The system of claim 1, wherein the retainer comprises a sacrificial interface between a first movable projection and a second fixed projection, the first movable projection being mechanically coupled to the actuator such that spring is maintained in a loaded state until the retainer is transformed in response to a trigger event, the transformation of the retainer freeing the actuator to move from its first position to its second position.

18. The valve of claim 17, wherein the sacrificial interface comprises a layer of a selectively meltable material disposed between the projections.

* * * * *